US012126104B2

(12) United States Patent
Maier et al.

(10) Patent No.: US 12,126,104 B2
(45) Date of Patent: Oct. 22, 2024

(54) ELECTRICAL PLUG-IN CONNECTOR AND ELECTRICAL PLUG-IN CONNECTION

(71) Applicant: Rosenberger Hochfrequenztechnik Gmbh & Co. KG, Fridolfing (DE)

(72) Inventors: Thomas Maier, Burghausen (DE); Till Bredbeck, Siegsdorf (DE); Franz Xaver Huber, Anger (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 0 days.

(21) Appl. No.: 18/207,885

(22) Filed: Jun. 9, 2023

(65) Prior Publication Data

US 2023/0402778 A1 Dec. 14, 2023

(30) Foreign Application Priority Data

Jun. 13, 2022 (EP) .................................... 22178603

(51) Int. Cl.
*H01R 12/72* (2011.01)
*H01R 12/75* (2011.01)
*H01R 13/6473* (2011.01)

(52) U.S. Cl.
CPC ........... *H01R 12/724* (2013.01); *H01R 12/75* (2013.01); *H01R 13/6473* (2013.01)

(58) Field of Classification Search
CPC ........ H01R 12/71; H01R 12/72; H01R 12/75; H01R 12/721; H01R 12/722; H01R 12/724; H01R 13/646; H01R 13/6473; H01R 13/6474; H01R 13/6477
USPC ..................................................... 439/78–80
See application file for complete search history.

(56) References Cited

U.S. PATENT DOCUMENTS

| | | | | |
|---|---|---|---|---|
| 9,502,796 B2 * | 11/2016 | Genau | .................. | H01R 12/724 |
| 11,545,789 B2 * | 1/2023 | Unterhauser | ........ | H01B 11/002 |
| 2023/0402778 A1 * | 12/2023 | Maier | ................ | H01R 13/6473 |

FOREIGN PATENT DOCUMENTS

| | | |
|---|---|---|
| EP | 3930111 A1 | 12/2021 |
| EP | 3944430 A1 | 1/2022 |

OTHER PUBLICATIONS

European Search Report dated Nov. 21, 2022.

* cited by examiner

*Primary Examiner* — Khiem M Nguyen
(74) *Attorney, Agent, or Firm* — Randall Danskin P.S.

(57) ABSTRACT

An electrical plug-in connector for transmitting a differential signal between a first interface and a second interface comprises a first contact element and a second contact element. A longitudinal axis of the first and second contact element in a first longitudinal portion, at the interface, is oriented at a first angle ($\phi_1'$) with respect to a second longitudinal portion of the contact elements at the second interface. A third longitudinal portion of the contact elements is between the first and second longitudinal portions, where at the contact elements are each bent, relative to a first axis of rotation that is orthogonal to the longitudinal axes in the first and second longitudinal portions, through a first angle of rotation $\phi_1$. In the third longitudinal portion the contact elements are each additionally bent through a second angle of rotation $\phi_2$.

18 Claims, 12 Drawing Sheets

ELECTRICAL PLUG-IN CONNECTOR AND ELECTRICAL PLUG-IN CONNECTION

CROSS-REFERENCE TO RELATED APPLICATIONS

This US National Stage Non-Provisional Patent Application claims priority to earlier filed European Patent Application No. EP 22 178 603.1 which was filed on 13 Jun. 2022. The entire contents of earlier filed European Patent Application No. EP 22 178 603.1 is expressly and fully incorporated herein by this reference.

Pursuant to USPTO rules, this priority claim to earlier filed European Patent Application No. EP 22 178 603.1 which was filed on 13 Jun. 2022 is also included in the Application Data Sheet (ADS) filed with this application.

FIELD OF INVENTION

The present invention relates to an electrical plug-in connector. The present invention also relates to an electrical plug-in connection.

BACKGROUND OF THE INVENTION

While the two electrical interfaces of a straight electrical plug-in connector have a common longitudinal axis, the longitudinal axes of the two electrical interfaces of an angled electrical plug-in connector are oriented at a particular angle to each other, preferably at an angle of 90°. Angled electrical plug-in connectors of this type are used in a wide variety of configurations in which the application of the electrical connection requires a change of direction in the signal routing in each case. Angled plug-in connectors are used, for example, for an electrical connection between two printed circuit boards that are oriented perpendicularly with respect to each other, or for routing a cable parallel to the surface of the printed circuit board for reasons of installation space.

If a differential signal is transmitted in an angled plug-in connector, it is known that two inner-conductor contact elements are required for this purpose. If the two inner-conductor contact elements each have the same distance between the two interfaces, in particular between their two axial ends, two identical inner-conductor contact elements can be guided parallel to each other in the angled plug-in connector. In addition to the use of identical parts for the two inner-conductor contact elements, in particular a simple impedance matching of the angled plug-in connector for the transmission of a differential high-frequency signal can be realized. Due to the equal lengths of the two inner-conductor contact elements, there is additionally no phase offset, no so-called "skewing", of the differential signal along the two inner-conductor contact elements. As disclosed herein, this means that there is no mode conversion of the differential signal and thus no increased radiation of electromagnetic interference and no reflection of the differential high-frequency signal.

The applications of angled plug-in connectors are becoming increasingly diverse, and with them the arrangement of the two inner-conductor contact elements at the two interfaces or at the axial ends of the two inner-conductor contact elements. The multiplicity of arrangements of the two inner-conductor contact elements at the two interfaces allows a multiplicity of shapes of the inner-conductor contact elements between the two interfaces and thus a different quality of impedance matching, a different version of a skewing and a different degree of symmetry of the inner-conductor contact elements.

In contrast to the above-mentioned trivial case of identical inner-conductor contact elements, for other shapes of inner-conductor contact elements it is not possible to achieve an optimum in all three criteria of impedance matching, skewing and symmetry.

Against this background, the present invention is based on the object of creating a generally applicable technical solution for a differential angled plug-in connector for all possible arrangements of the inner-conductor contact elements at the two interfaces—with the exception of the above-mentioned trivial case—by which an overall optimum of the criteria of impedance matching, skewing and symmetry can be achieved.

According to the invention, this object is achieved by an electrical plug-in connector, and by an electrical plug-in connection, as disclosed herein, including as disclosed in the claims.

An electrical plug-in connector for transmitting a differential signal between a first interface and a second interface, comprising: a pair of contact elements having, a first contact element, and a second contact element, and wherein a longitudinal axis of the first and of the second contact element in a first longitudinal portion of the first and of the second contact element at the first interface being oriented at a first angle with respect to the longitudinal axis of the first and of the second contact element in a second longitudinal portion of the first and of the second contact element at the second interface, respectively; a first plane spanned by the longitudinal axis of the first and of the second contact element in the first longitudinal portion being oriented at a second angle with respect to the longitudinal axes of the first and of the second contact element in the second longitudinal portion; a third longitudinal portion of the first and of the second contact element being realized between the first and the second longitudinal portion of the first and of the second contact element, respectively; in the third longitudinal portion, the first and the second contact element each being bent, relative to a first axis of rotation that is oriented orthogonally with respect to the longitudinal axis of the first and of the second contact element, respectively, in the first and in the second longitudinal portion, respectively, through a first angle of rotation corresponding to the first angle; in the third longitudinal portion the first and the second contact element each being additionally bent in such a way that the longitudinal axes of the first and of the second contact element are shifted in parallel, through a second angle of rotation, relative to a second axis of rotation that extends centrally between the first and the second contact element in the third longitudinal portion; and the second angle of rotation resulting from subtraction of the second angle from an angle of 90°.

The knowledge/idea on which the present invention is based consists in creating an angled differential plug-in connector comprising a pair of contact elements, i.e. comprising a pair of inner conductor contact elements, composed of a first contact element and a second contact element, the spacing of which over the entire longitudinal extent has the smallest possible variance and is preferably constant. Such a configuration of the two inner-conductor contact elements advantageously renders possible an impedance characteristic with the smallest possible fluctuations, in order preferably to realize a constant impedance characteristic.

While the distance between the first and the second contact element in a first longitudinal portion, in which the first interface of the differential angled plug-in connector is realized, and in a second longitudinal portion, in which the second interface of the differential angled plug-in connector is realized, is usually constant, the distance between the first and the second contact element in a third longitudinal portion realized in-between can be minimized by a suitable shape of the first and the second contact element in respect of its variance.

The transition between the first and the third longitudinal portion of the pair of contact elements, and thus the axial end of the first longitudinal portion of the two contact elements, is arranged at that axial position of the pair of contact elements at which at least one contact element transitions from a linear shape to a curved shape. This applies in equivalent manner to the transition between the second and the third longitudinal portion of the pair of contact elements.

In order to minimize the variance of the distance between the two contact elements, the first and second contact elements in the third longitudinal portion are bent about the same axis of rotation, which in the following is referred to as the first axis of rotation and is oriented orthogonally to the longitudinal axis of the first and of the second contact element in the first and in the second longitudinal portion, the same angle of rotation, which in the following is referred to as the first angle of rotation $\phi_1$. In addition, the first and second contact elements are each bent in the third longitudinal portion in such a way that the longitudinal axes of the first and of the second contact element are shifted in parallel relative to a further axis of rotation, which in the following is referred to as the second axis of rotation and which extends centrally between the first and the second contact element, through a further same angle of rotation, which in the following is referred to as the second angle of rotation $\phi_2$. The second axis of rotation in this case may have a linear or a curved characteristic, as will be shown in the discussion of the individual variants of the contact elements.

As a result of the two contact elements each being bent through a first angle of rotation $\phi_1$ about the first axis of rotation in the third longitudinal portion, the orientation of the longitudinal axes of the first and of the second contact element between the first and the second longitudinal portion is bridged by the first angle $\phi_1'$. The first angle of rotation $\phi_1$ in this case corresponds to the first angle $\phi_1'$. In this way, the basic angularity of the differential angled plug-in connector is realized in a plane that is oriented perpendicularly with respect to the first axis of rotation.

Preferably, the first angle is 90°, such that a right-angled differential plug-in connector can be realized.

As a result of the two contact elements being bent about the second axis of rotation through a second angle of rotation $\phi_2$, a further orientation of a plane, which is spanned by the longitudinal axes of the first and the second contact element in the first longitudinal portion and is referred to below as the first plane, is bridged with respect to the orientation of the first and second contact elements in the second longitudinal portion by the second angle $\phi_2'$. The second angle of rotation $\phi_2$ results from subtraction of the second angle $\phi_2'$ from an angle of 90°. As a result of the two contact elements being bent about the second axis of rotation, which in the third longitudinal portion extends centrally between the first and the second contact element, by the second angle of rotation $\phi_2$, an additional tilting of the two contact elements, i.e. a further angularity of the differential angled plug-in connector in a further degree of freedom, can thus be achieved. Centrally between the first and the second contact element is understood in this context as an equal, or approximately equal, radial distance between the two contact elements and the second axis of rotation along the entire longitudinal extent of the third longitudinal portion.

Preferably, the second angle is 0°, such that the first plane at the first interface is aligned parallel to the longitudinal axes of the first and of the second contact element at the second interface.

In particular, the bending of the two contact elements about the second axis of rotation significantly expands the variety of arrangements of the two contact elements at the two interfaces, and thus the variety of applications of the differential angled plug-in connector.

Above all, however, the bending of the two contact elements about the second axis of rotation advantageously makes it possible to space apart the two contact elements, the variance of which along the third longitudinal portion is minimized and preferably constant.

Based on this optimization, a largely constant, and preferably constant, impedance characteristic of the differential transmission system can be realized in the third longitudinal portion by a corresponding configuration of the insulator element and the outer-conductor contact element.

The first and the second contact element may preferably be produced either in a stamping or in a turning process. However, other manufacturing technologies are also conceivable, such as, for example, casting, deep-drawing or press-forming. The first and the second contact element preferably have a cross-section of rectangular shape after a stamping process, and a round cross-section after a turning process. In a less common realization variant, a round cross-section, in particular a hollow cylindrical cross-section, may also be obtained by means of a stamping-and-bending process.

In a preferred version of the pair of contact elements, the bending of the two contact elements relative to the first axis of rotation as well as relative to the second axis of rotation may overlap fully within the third longitudinal portion. Partial overlapping of the bending of the two contact elements relative to the first axis of rotation and relative to the second axis of rotation within the third longitudinal portion is also conceivable. Finally, the bending of the two contact elements relative to the first axis of rotation and relative to the second axis of rotation may be realized in respectively successive sub-portions of the third longitudinal portion.

The longitudinal axes of the first contact element and of the second contact element are shifted in parallel by the bending the contact elements about the second axis of rotation, respectively between the axial ends of the third longitudinal portion (in the case of complete overlap) or between the axial ends of the sub-portion of the third longitudinal portion (in the case of partial overlap or sequential overlap).

The bending of the two contact elements may be effected in all three versions—full overlapping, partial overlapping and sequentially following each other—in each case continuously over the entire longitudinal extent of the third longitudinal portion. The bending of the two contact elements may be realized in this case as a curving around one radius of bend (convex bending or concave bending) or as a curving around two radii of bend (S-shape from the sequential combination of a concave bending and a convex bending).

Finally, the bending of the two contact elements may also be effected only in discrete sub-portions of the third longitudinal portion, between each of which a linear sub-portion of the two contact elements is arranged. In particular in the latter case, the two contact elements may be bent in individual discrete sub-portions of the third longitudinal portion both relative to the first axis of rotation and simultaneously relative to the second axis of rotation. It is also conceivable, however, for bending of the two contact elements to be effected in each case, in individual discrete sub-portions of the third longitudinal portion, only relative to the first axis of rotation or only relative to the second axis of rotation.

The continuous bending of the two contact elements over the entire third longitudinal portion can preferably be realized by a turning process. On the other hand, the bending of the two contact elements in discrete sub-portions of the third longitudinal portion that are connected by linear sub-portions of the two contact elements is more suitable for a stamping process.

The two contact elements each have the same cross-section, which is a constant cross-section along their entire longitudinal extent. With regard to impedance matching of the electrical plug-in connector configured for high-frequency signal transmission, the cross-section of the two contact elements may also change in individual sub-portions. This occurs, for example, if for assembly reasons the insulator element and the outer-conductor contact element have recesses or other irregularities in certain regions of the differential angled plug-in connector. Finally, special shapes, such as latching claws or latching hooks or latching recesses for latching the contact element to an adjacent insulator element of the electrical plug-in connector, may be realized at individual points on each of the two contact elements.

Advantageous designs and developments will be apparent from the description with reference to the figures in the drawing.

It is understood that the above-mentioned features and those to be explained below can be used not only in the combination indicated in each case, but also in other combinations or on their own, without departure from the scope of the present invention.

In a preferred version of the differential angled plug-in connector, both the first and the second contact element are of equal electrical length. Usually, the electrical lengths of the first and of the second contact element in the first longitudinal portion and in the second longitudinal portion are equal, due to the two contact elements being routed in parallel in the first and in the second longitudinal portion. In addition, the electrical length, and thus the longitudinal extent, of the first and of the second contact element in the third longitudinal portion is preferably equal.

The equal longitudinal extent of the two contact elements advantageously enables the use of identical parts for the two contact elements.

Furthermore, due to the equal electrical length of the two contact elements, a phase shift of the differential signal between the two contact elements of the pair of contact elements, a so-called “skewing”, is advantageously avoided. If skewing is avoided in the entire longitudinal extent, and in particular in the third longitudinal portion of the pair of contact elements, the ratio between the common mode and the differential mode of the high-frequency electromagnetic wave remains approximately constant, and preferably is constant.

A mode conversion caused by skewing, and thus a radiation of electromagnetic interference as well as a reflection of the high-frequency electromagnetic wave, is advantageously avoided. Advantageously, therefore, in respect of skewing there is also no need for a deskewing portion to be realized outside of the differential angled plug-in connector, i.e. a differential signal portion of an inverse electrical length, in the skewing case.

In order to achieve an equal longitudinal extent of the first contact element and of the second contact element within the third longitudinal portion in the case of parallel shifting of the longitudinal axes of the first and of the second contact element as a result of the first and the second contact element being bent, relative to the common second axis of rotation, through the same second angle of rotation, a constant or approximately constant ratio, between the parallel shifting of the longitudinal axis and the change in the longitudinal extent, is preferably to be realized for both contact elements over the third longitudinal portion.

In order to achieve the same longitudinal extent for both contact elements, the curvature of the bend may thus preferably be the same for both contact elements along the third longitudinal portion. However, it is also conceivable in a special case that in individual sub-portions of the two contact elements within the third longitudinal portion there is no parallel shifting of the longitudinal axes, i.e. no bend, but a linear course of the two contact elements is realized, parallel to the second axis of rotation.

Also possible are sub-portions of the two contact elements without any bending of the contact elements, in which a linear course of the two contact elements is not realized parallel to the second axis of rotation. Finally, also possible are sub-portions of the contact elements within the third longitudinal portion, in which in each case the ratio between the parallel shifting of the longitudinal axis and the change in the longitudinal extent is different for both contact elements, but the summed changes in the longitudinal extent are the same for both contact elements in the entire third longitudinal portion.

In a further preferred version of the electrical plug-in connector, the first and the second contact element in the third longitudinal portion are each bent relative to the first axis of rotation, through the first angle of rotation, with an equal radius of bend. Bending of the two contact elements relative to the same axis of rotation, through the same angle of rotation and with the same radius of curvature, allows an equal electrical length to be realized for both contact elements in the third longitudinal portion.

The bending of the two contact elements in the third longitudinal portion relative to the common second axis of rotation, through the same second angle of rotation, is effected, in a further preferred version of the pair of contact elements, in such a way that the longitudinal axes of the first and of the second contact element are each shifted by the same amount in parallel in a first radial direction, with respect to the second axis of rotation, and are each shifted by the same amount in parallel in a second radial direction, with respect to the second axis of rotation, that is oriented orthogonally to the first radial direction. Such a version of a bending of the two contact elements about the second axis of rotation, in combination with the version whereby the common second axis of rotation is arranged centrally with respect to the two contact elements, allows an equal electrical length to be achieved for both contact elements in the simplest technical manner.

In a further version of the pair of contact elements, the bending of the first and of the second contact element about the first axis of rotation and the bending of the first and of the second contact element about the second axis of rotation are effected in different sub-portions of the third longitudinal portion which follow one another sequentially. In this case, the sub-portion in which the two contact elements are each bent relative to a first axis of rotation, through the same first angle of rotation, is preferably arranged on the second longitudinal portion. The sub-portion in which the two contact elements are each bent relative to the common second axis of rotation, through the same second angle of rotation, is preferably realized between the first longitudinal portion and the other sub-portion of the third longitudinal portion.

Depending on the application, the first angle of rotation through which the first and the second contact element are each bent in the third longitudinal portion relative to the first axis of rotation lies in an angular range of between 45° and 135°, preferably in an angular range of between 70° and 110°, particularly preferably in an angular range of between 85° and 95°, and is most preferably 90°.

Depending on the application, the second angle of rotation through which the contact elements in the third longitudinal portion are bent relative to the common second axis of rotation, i.e. the longitudinal axes of the first contact element and of the second contact element are shifted in parallel within the third longitudinal portion, is greater or less than 0°, preferably greater than 45° or less than −45°, particularly preferably greater than 80° or less than −80°, and is most preferably ±90°.

Preferably, in the first longitudinal portion, in the second longitudinal portion and in the third longitudinal portion, i.e. in the entire longitudinal extent between the first and the second interface, a distance between the first contact element and the second contact element is the same in each case, and/or a diameter of the first and of the second contact element is in each case the same and constant. If the outer-conductor contact element and the insulator element that electrically insulates the first contact element and the second contact element from the outer-conductor contact element, are likewise homogeneous along the entire longitudinal extent between the first and the second interface, a constant and thus matched impedance characteristic is realized over the entire longitudinal extent of the angled differential plug-in connector. The homogeneity of the insulator element is realized, for example, by a uniform dielectric material and by a homogeneous distribution of the dielectric material of the insulator, between the outer-conductor contact element and the (inner conductor) pair of contact elements, over the entire longitudinal extent of the plug-in connector. The homogeneity of the outer-conductor contact element is realized by a constant inner diameter over the entire longitudinal extent of the plug-in connector.

To enable assembling of the first contact element and the second contact element, the insulator element and the outer conductor element each have recesses in particular longitudinal portions of the angled differential plug-in connector, which cause an unwanted shift in the impedance. For the purpose of impedance matching in such longitudinal portions, for example the spacing of the first and of the second contact element has to be reduced accordingly and/or the diameter of the first and of the second contact element has to be increased accordingly.

In a further preferred version of the pair of contact elements, the first and the second contact elements are each of the same extent in the third longitudinal portion in a direction of the longitudinal axes of the first contact element and of the second contact element in the first longitudinal portion. Thus, the total longitudinal extent of the two contact elements from the transition between the second and the third longitudinal portion and the axial end of the first longitudinal portion is the same in each case. The longitudinal extent of the two contact elements from the transition between the second and the third longitudinal portion and the axial end of the second longitudinal portion is likewise the same. Thus, the transition between the second and the third longitudinal portion of the contact elements represents the angle vertex of the differential angle connector, while the extents of the two contact elements from the transition between the second and the third longitudinal portion to the axial ends of the first and of the second longitudinal portion respectively form the two angle legs of the differential angle connector.

A second plane, spanned by the longitudinal axes of the first and of the second contact element at the second interface, may have the same orientation as a plane spanned by the longitudinal axes of the first and of the second contact element at the axial end of the third longitudinal portion that faces toward the second interface. This plane is referred to below as the third plane.

However, it is also conceivable for the second plane to be oriented at a third angle, which is other than 0°, with respect to the third plane. In this case, a fourth longitudinal portion of the first contact element and of the second contact element is realized between the second and the third longitudinal portion. In the fourth longitudinal portion, the first and the second contact element are each bent in such a way that, with an equal longitudinal extent of the first and of the second contact element, the longitudinal axes of the first and of the second contact element are shifted in parallel, through a third angle of rotation, relative to a third axis of rotation that extends centrally between the first and the second contact element in the fourth longitudinal portion.

The bending of the two contact elements in the fourth longitudinal portion relative to the common third axis of rotation, through the same third angle of rotation, is preferably also effected in such a way that the longitudinal axes of the first contact element and of the second contact element are each shifted by the same amount in parallel in a first radial direction, with respect to the third axis of rotation, and are each shifted by the same amount in parallel in a second radial direction, with respect to the third axis of rotation, that is oriented orthogonally to the first radial direction. Such a version of a bending of the two contact elements about the third axis of rotation, in combination with the version whereby the common third axis of rotation is arranged centrally to the two contact elements, allows an equal electrical length to be realized for both contact elements in the fourth longitudinal portion in the simplest manner.

The third angle of rotation, which corresponds to the third angle between the second plane and the third plane, is to be so configured so as to be equivalent to the second angle of rotation:

The third angle of rotation is greater than or less than 0°, preferably greater than 45° or less than −45°, particularly preferably greater than 80° and less than −80°, and is most preferably ±90°.

In a preferred application of the angled differential plug-in connector, the first interface is configured to contact an electrical mating plug-in connector and the second interface is configured to contact a printed circuit board. Alternatively, however, it is also conceivable for the first and the second interfaces each to be configured to contact a different printed circuit board. The angled differential plug-in connector may also be realized as a cable plug-in connector or as a housing plug-in connector. In this case, the first interface is configured to contact an electrical mating plug-in connector, and the second interface is configured to contact a cable, or contacting device, in a housing. Finally, the angled differential plug-in connector may also be realized as an adapter in which the first and the second interface are each configured to contact a different electrical mating plug-in connector.

The invention also includes an electrical plug-in connection comprising the electrical plug-in connector and an associated electrical mating plug-in connector. All the features, represented features and claimed features disclosed thus far and in the following relating the electrical plug-in connector also apply in equivalent manner to the electrical plug-in connection, and vice versa.

The electrical mating plug-in connector has a pair of mating contact elements having a first and a second mating contact element. The first and the second mating contact element each preferably have a longitudinal extent of equal electrical length, routed in parallel to each other. A straight differential electrical mating plug-in connector is conceivable. Preferably, the differential electrical mating plug-in connector is angled, such that the first and the second mating contact element are each bent through a fourth angle, preferably each through 90°, with an equal radius of curvature.

The first and the second mating contact element thus have a first longitudinal portion, a third longitudinal portion adjoining the first longitudinal portion, and a second longitudinal portion adjoining the third longitudinal portion. The first longitudinal portion of the first and of the second mating contact element of the plug-in connector are configured, respectively, to contact the first and the second contact elements of the plug-in connector at the first interface thereof. In the third longitudinal portion, the first and the second mating contact element of the mating plug-in connector are each bent through the fourth angle. The second longitudinal portion of the first and of the second mating contact element forms a further interface of the mating plug-in connector, for example to a further cable.

The above designs and developments can be combined with each other in any appropriate manner. Further possible designs, developments and implementations of the invention also include combinations of features of the invention described herein with respect to the exemplary embodiments that are not explicitly mentioned. In particular, a person skilled in the art will in this case also add individual aspects as improvements or additions to the respective basic form of the present invention.

SUMMARY

An electrical plug connector and electrical plug-in connection generally provides an electrical plug-in connection for transmitting a differential signal between a first interface and a second interface, the electrical plug-in connection having a pair of contact elements with a first contact element and a second contact element.

A principal aspect of the present invention is an electrical plug-in connector (1) for transmitting a differential signal between a first interface (2) and a second interface (4), comprising a pair of contact elements (6) having a first contact element ($7_1$) and a second contact element ($7_2$), a longitudinal axis of the first and of the second contact element ($7_1$, $7_2$) in a first longitudinal portion (14) of the first and of the second contact element ($7_1$, $7_2$) at the first interface (2) being oriented at a first angle ($\phi_1'$) with respect to the longitudinal axis of the first and of the second contact element ($7_1$, $7_2$) in a second longitudinal portion (15) of the first and of the second contact element ($7_1$, $7_2$) at the second interface (4), respectively, a first plane ($19_1$) spanned by the longitudinal axis of the first and of the second contact element ($7_1$, $7_2$) in the first longitudinal portion (14) being oriented at a second angle ($\phi_2'$) with respect to the longitudinal axes of the first and of the second contact element ($7_1$, $7_2$) in the second-longitudinal portion (15), a third longitudinal portion (16) of the first and of the second contact element ($7_1$, $7_2$) being realized between the first and the second longitudinal portion (14, 15) of the first and of the second contact element ($7_1$, $7_2$), respectively, in the third longitudinal portion (16) the first and the second contact element ($7_1$, $7_2$) each being bent, relative to a first axis of rotation ($17_1$) that is oriented orthogonally with respect to the longitudinal axis of the first and of the second contact element ($7_1$, $7_2$) respectively, in the first and in the second longitudinal portion (14, 15), respectively, through a first angle of rotation $\phi_1$ corresponding to the first angle $\phi_1'$, in the third longitudinal portion (16) the first and the second contact element ($7_1$, $7_2$) each being additionally bent in such a way that the longitudinal axes of the first and of the second contact element ($7_1$, $7_2$) are shifted in parallel, through a second angle of rotation $\phi_2$, relative to a second axis of rotation ($17_2$) that extends centrally between the first and the second contact element ($7_1$, $7_2$) in the third longitudinal portion (16), and the second angle of rotation $\phi_2$ resulting from subtraction of the second angle $\phi_2'$ from an angle of 90°.

A further aspect of the present invention is an electrical plug-in connector (1) characterized in the third longitudinal portion (16), the longitudinal extent of the first and of the second contact element ($7_1$, $7_2$) being equal, the longitudinal axes of the first and of the second contact element ($7_1$, $7_2$) are shifted in parallel, relative to the second axis of rotation ($17_2$), through the second angle of rotation $\phi_2$.

A further aspect of the present invention is an electrical plug-in connector (1) characterized in that, in the third longitudinal portion (16), the first and the second contact element ($7_1$, $7_2$) are each bent, relative to the first axis of rotation ($17_1$), through the first angle of rotation $\phi_1$ with an equal radius of bend.

A further aspect of the present invention is an electrical plug-in connector (1) characterized in that, in the third longitudinal portion (16), the first and the second contact element ($7_1$, $7_2$) are each bent, relative to the second axis of rotation ($17_2$), through the second angle of rotation $\phi_2$ in such a way that the longitudinal axes of the first and of the second contact element ($7_1$, $7_2$) are each shifted by the same amount in parallel in a first radial direction, with respect to the second axis of rotation ($17_2$), and are each shifted by the same amount in parallel in a second radial direction, with respect to the second axis of rotation ($17_2$), that is oriented orthogonally with respect to the first radial direction.

A further aspect of the present invention is an electrical plug-in connector (1) characterized in that the first and the second contact element ($7_1$, $7_2$) are each bent through the first angle of rotation $\phi_1$ in a first sub-portion ($16_1$) of the third longitudinal portion (16) that adjoins the second longitudinal portion (15), and are bent through the second angle of rotation $\phi_2$ in a second sub-portion ($16_2$) of the third longitudinal portion (16) that is between the first longitudinal portion (2) and the first sub-portion ($16_1$) of the third longitudinal portion (16).

A further aspect of the present invention is an electrical plug-in connector (1) characterized in that the first angle of rotation $\phi_1$ lies in an angular range of between 45° and 135°, preferably in the angular range of between 70° and 110°, particularly preferably in the angular range of between 85° and 95°, and is most preferably 90°.

A further aspect of the present invention is an electrical plug-in connector (1) characterized in that the second angle of rotation $\phi_2$ greater than or less than 0°, preferably greater than 45° or less than −45°, particularly preferably greater than 80° and less than −80°, and is most preferably ±90°.

A further aspect of the present invention is an electrical plug-in connector (1) characterized in that, in the third longitudinal portion (16), the first and the second contact element ($7_1$, $7_2$) are each of the same extent in a direction of the longitudinal axes of the first and of the second contact element ($7_1$, $7_2$) in the first longitudinal portion (14).

A further aspect of the present invention is an electrical plug-in connector (1) characterized in that a fourth longitudinal portion (18) of the first and of the second contact element ($7_1$, $7_2$) is realized between the third and the second longitudinal portion (16, 15), in the fourth longitudinal portion (18) the first and the second contact element (71, 72) each being bent in such a way that, with an equal longitudinal extent of the first and of the second contact element ($7_1$, $7_2$), the longitudinal axes of the first and of the second contact element ($7_1$, $7_2$) are shifted in parallel, through a third angle of rotation $\phi_3$, relative to third axis of rotation ($17_3$) that extends centrally between the first and the second contact element ($7_1$, $7_2$) in the fourth longitudinal portion (18).

A further aspect of the present invention is an electrical plug-in connector (1) characterized in that the third angle of rotation $\phi_3$ corresponds to a third angle ϕ3' between a second plane ($19_2$), which is spanned by the longitudinal axes of the first and of the second contact element ($7_1$, $7_2$) in the second longitudinal portion (4), and a third plane ($19_3$), which is spanned by the longitudinal axes of the first and of the second contact element ($7_1$, $7_2$) at an axial end of the third longitudinal portion (16) that faces toward the second interface (4).

A further aspect of the present invention is an electrical plug-in connector (1) characterized in that the third angle of rotation ϕ3 is greater than or less than 0°, preferably greater than 45° or less than −45°, particularly preferably greater than 80° or less than −80°, and is most preferably ±90°.

A further aspect of the present invention is an electrical plug-in connector (1) characterized in that the first interface (2) is configured to contact a mating plug-in connector, and the second interface (4) is configured to contact a printed circuit board.

A further aspect of the present invention is an electrical plug-in connector (1) characterized in that, in the first longitudinal portion (14), in the second longitudinal portion (15) and in the third longitudinal portion (16), a distance between the first and the second contact element ($7_1$, $7_2$) is the same in each case and/or a diameter of the first and of the second contact element (71, 72) is the same in each case.

A still further aspect of the present invention is an electrical plug-in connection (21) composed of an electrical plug-in connector (1) and of an associated electrical mating plug-in connector (5).

An even still further aspect of the present invention is an electrical plug-in connection (21) characterized in that the mating plug-in connector (5) has a pair of mating contact elements (21) having a first and a second mating contact element ($22_1$, $22_2$), the first and the second mating contact element ($22_1$, $22_2$) each having the same electrical length and each being bent through a fourth angle of rotation $\phi_{34}$, preferably each of 90°, with an equal radius of curvature.

These and other aspects of the present invention are more fully set forth and disclosed herein.

BRIEF DESCRIPTIONS OF THE FIGURES

The present invention is explained in more detail below with reference to the exemplary embodiments shown in the schematic figures of the drawings.

Figure 1A:
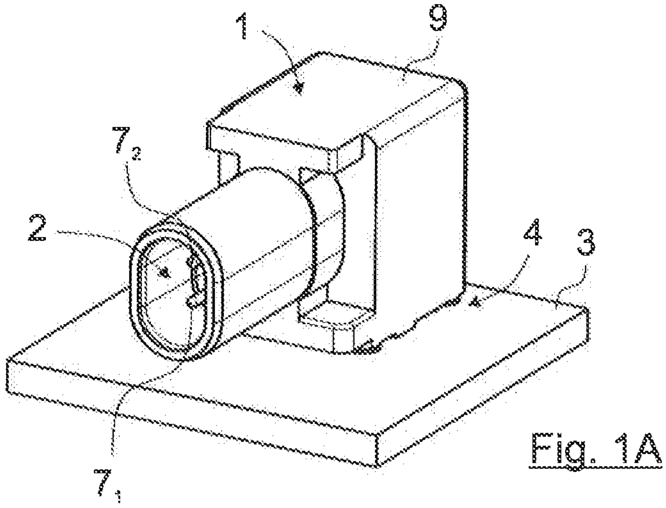
FIG. 1A shows an isometric representation of an electrical plug-in connector according to the invention.

The accompanying figures of the drawing are intended to provide further understanding of embodiments of the invention. They illustrate embodiments and, in combination with the description, serve to explain principles and concepts of the invention. Other embodiments and many of the advantages mentioned will be apparent by reference to the drawings. The elements of the drawings are not necessarily shown to scale in relation to each other.

In the figures of the drawing, elements, features and components that are the same, have the same function and are the same in their effect are in each case—unless otherwise stated—denoted by the same reference designations.

DETAILED WRITTEN DESCRIPTION OF THE PREFERRED EMBODIMENTS

This disclosure of the invention is submitted in furtherance of the Constitutional purposes of the US Patent Laws "to promote the progress of Science and the Useful Arts" (Article 1, Section 8).

Figure 1B:
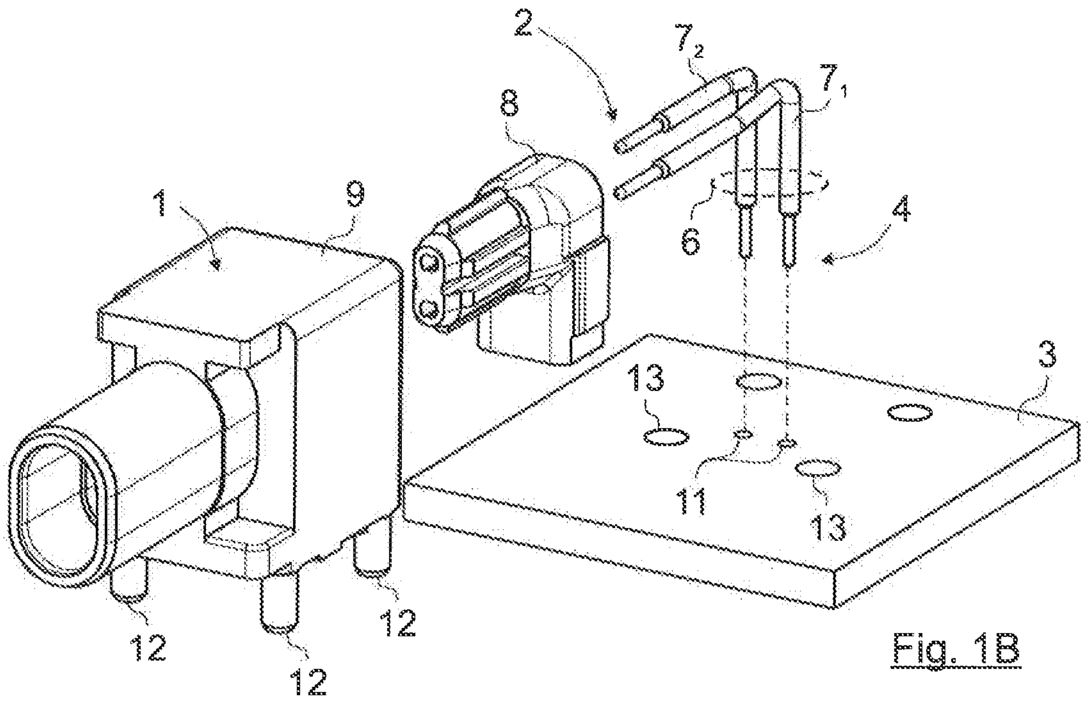
FIG. 1B shows an exploded representation of an electrical plug-in connector according to the invention.
Figure 1C:
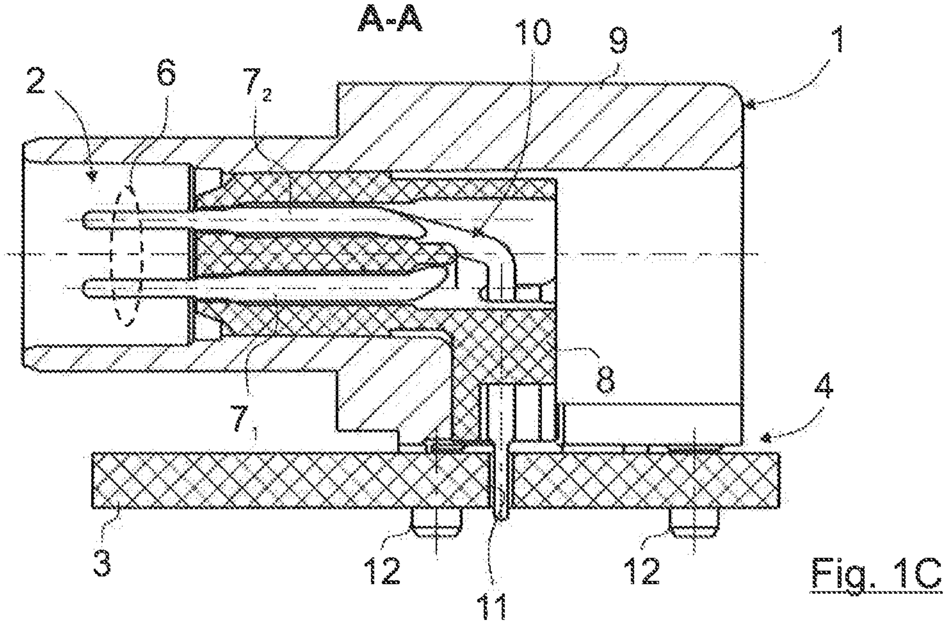
FIG. 1C shows a cross-sectional representation of an electrical plug-in connector according to the invention.
Figure 9A:
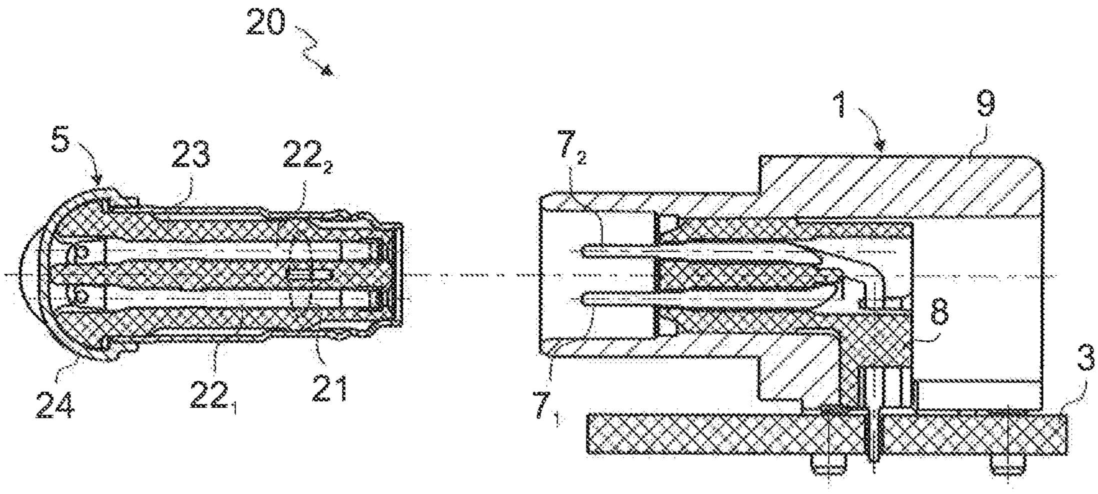
FIG. 9A shows a first sectional representation of the electrical plug-in connection according to the invention.
Figure 9B:
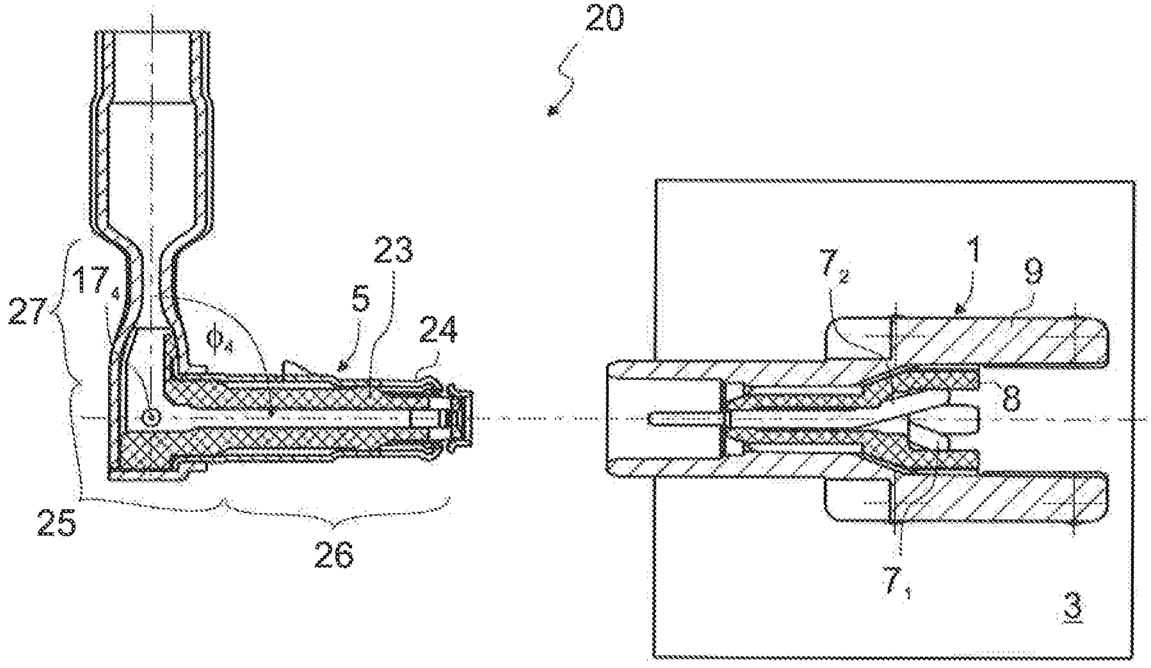
FIG. 9B shows a second sectional representation of the electrical plug-in connection according to the invention.
Figure 9C:
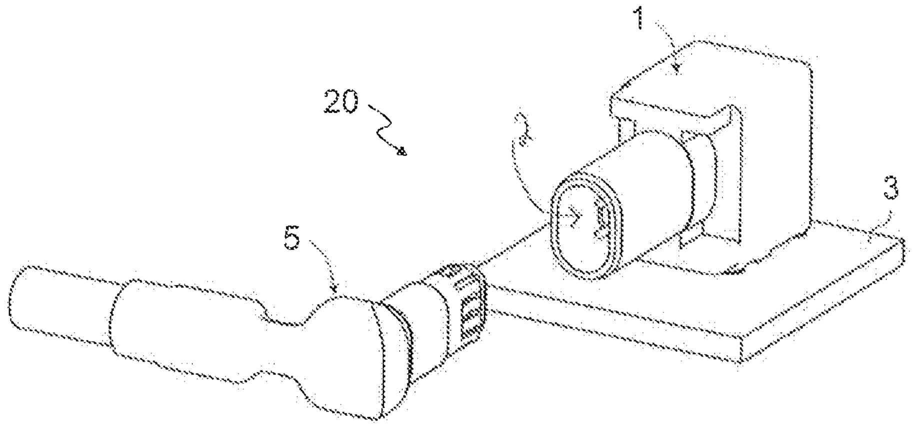
FIG. 9C shows an isometric representation of the electrical plug-in connection according to the invention.

A differential angled plug-in connector 1 is preferably embodied as a printed-circuit-board plug-in connector, and as shown by FIGS. 9A to 9C is connected at its first interface 2 to a corresponding pair of mating-contact elements of a differential mating plug-in connector 5, and as shown by FIGS. 1A to 1E is connected at its second interface 4 to a differential pair of signal lines on a printed circuit board 3. Alternatively, the differential angled plug-in connector may also connect differential pairs of signal lines on two printed circuit boards, or differential signal conductors of a cable to a corresponding pair of mating-contact elements of a differential mating plug-in connector. Conceivable are all configurations of a differential electrical connection in which differential contacts, differential contact elements, differential signal lines and the like of two connection partners are oriented at an angle to each other.

differential angled plug-in connector 1 has a pair of contact elements 6 having a first contact element $\mathbf{7}_1$ and a second contact element $\mathbf{7}_2$, which, as can be seen from the combination of the exploded representation in FIG. 1B and the cross-sectional representation in FIG. 1C, each extend between the first interface 2 and the second interface 4. The first contact element $\mathbf{7}_1$ and the second contact element $\mathbf{7}_2$ are routed, within the differential angled plug-in connector 1, in an insulator element 8 in such a way that, on the one hand, they are spaced apart from each other in an electrically insulated manner and, on the other hand, they are each spaced in an electrically insulated manner from an outer-conductor contact element 9. The outer-conductor contact element 9 may be the metallic connector housing or an outer-conductor contact element integrated in a dielectric connector housing. In order to achieve a good shielding effect and the best possible guiding of an electromagnetic wave between the outer-conductor contact element 8 and the pair of contact elements 6 serving as differential inner-conductor contact, the outer-conductor contact element 9 surrounds the insulator element 8 and the pair of contact elements 6 routed therein as comprehensively as possible. A differential angled plug-in connector 1 according to the invention without realization of an outer-conductor contact element 8 is not the preferred realization of a high-frequency plug-in connector, but is also included in the invention.

The first contact element $\mathbf{7}_1$ and the second contact element $\mathbf{7}_2$ are fixed positively and non-positively to the insulator element 8, for example by means of claws realized on the first contact element $\mathbf{7}_1$ and on the second contact element $\mathbf{7}_2$, respectively. The fixing of the insulator element 8 to the outer-conductor contact element 9 is effected, for example, by means of an interference fit.

For assembly reasons, the outer-conductor contact element 9 does not fully encompass the insulator element 8, and the insulator element 8 does not fully encompass the pair of contact elements 6 over the entire longitudinal extent of the pair of contact elements 6. In particular, in a middle longitudinal portion 10 of the pair of contact elements 6, as shown for example in FIG. 1C, the first contact element $\mathbf{7}_1$ and the second contact element $\mathbf{7}_2$ are arranged at a distance from each other, but are surrounded by air and not by the dielectric material of the insulator element 8. Since such a change in the nature of the dielectric in the intermediate region between the outer conductor and the two inner conductors represents a change in the impedance characteristic, the diameter of the first contact element $\mathbf{7}_1$ and of the second contact element $\mathbf{7}_2$ is increased, and/or the distance between the first contact element $\mathbf{7}_1$ and the second contact element $\mathbf{7}_2$ is reduced, for example in the region of the middle longitudinal portion 10 of the pair of contact elements 6, in order to achieve a more balanced impedance characteristic.

At the second interface 4 of the plug-in connector 1, which forms the interface to the printed circuit board 3, the contact ends of the first contact element $\mathbf{7}_1$ and of the second contact element $\mathbf{7}_2$ are inserted into associated inner-conductor holes 11 in the printed circuit board 3 and are electrically and mechanically connected, for example by means of a soldered joint or a non-positive interference joint, to contact surfaces on the inner wall of the inner-conductor holes 11. A plurality of pins 12 realized on the outer-conductor contact element 9, preferably pins 12 realized at each of the four corners of the second interface 4 of the plug-in connector 1, are correspondingly inserted into associated outer-conductor holes 13 in the printed circuit board 3 and are electrically and mechanically connected to the contact surfaces on the inner wall of the outer-conductor holes 13.

Figure 1D:
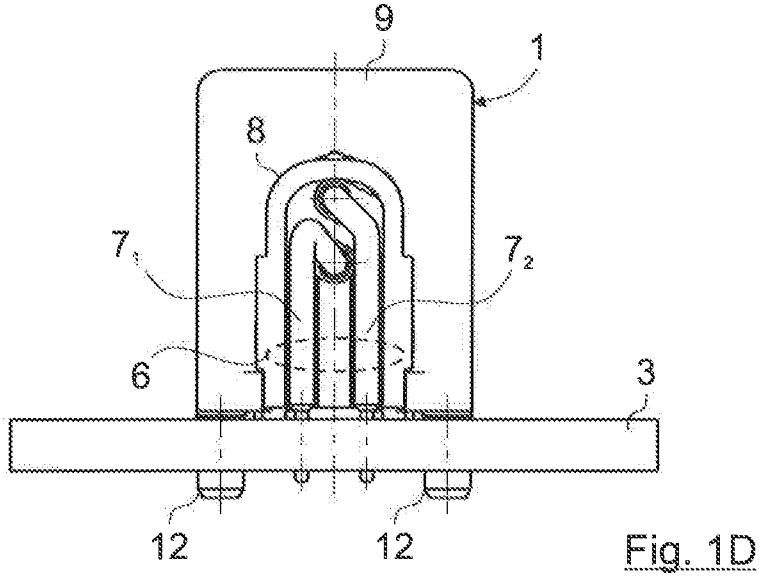
FIG. 1D shows a first side view of an electrical plug-in connector according to the invention.
Figure 1E:
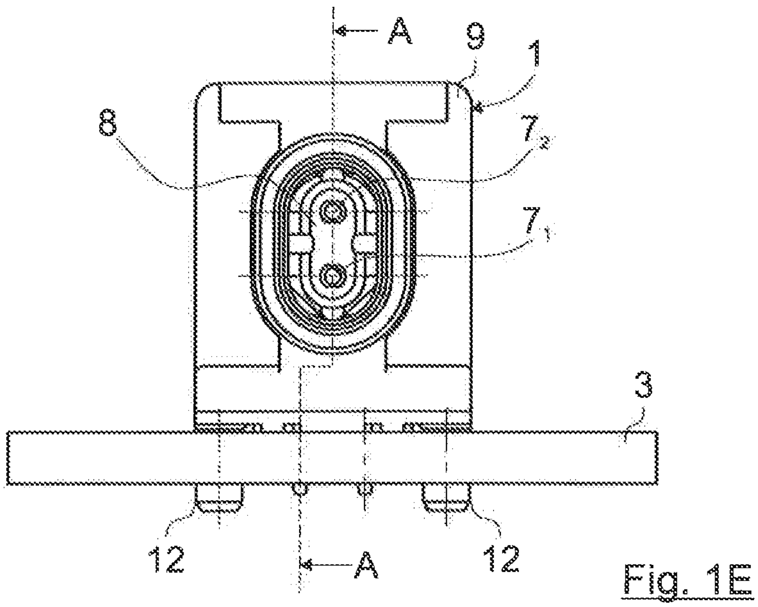
FIG. 1E shows a second side view of an electrical plug-in connector according to the invention.

FIG. 1D shows a side view of the differential angled plug-in connector from the rear, i.e. from a side, opposite to the plug-in side, from which the individual components of the plug-in connector are assembled. FIG. 1E shows a side view from the front, i.e. from the plug-in side, from which the differential angled plug-in connector is plugged into a corresponding differential mating plug-in connector. FIGS. 1D and 1E serve to further illustrate the individual components of the plug-in connector, in particular the layout of the first and of the second contact element $7_1$ and $7_2$.

Figure 2A:
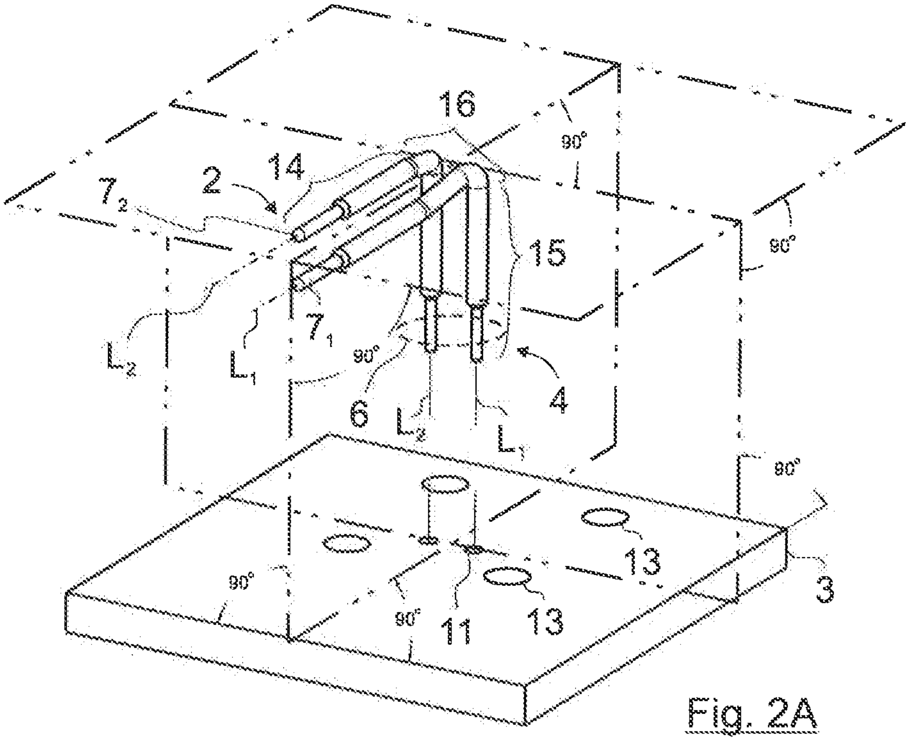
FIG. 2A shows an isometric representation of a first exemplary embodiment of the differential pair of contact elements of the electrical plug-in connector according to the invention.
Figure 2B:
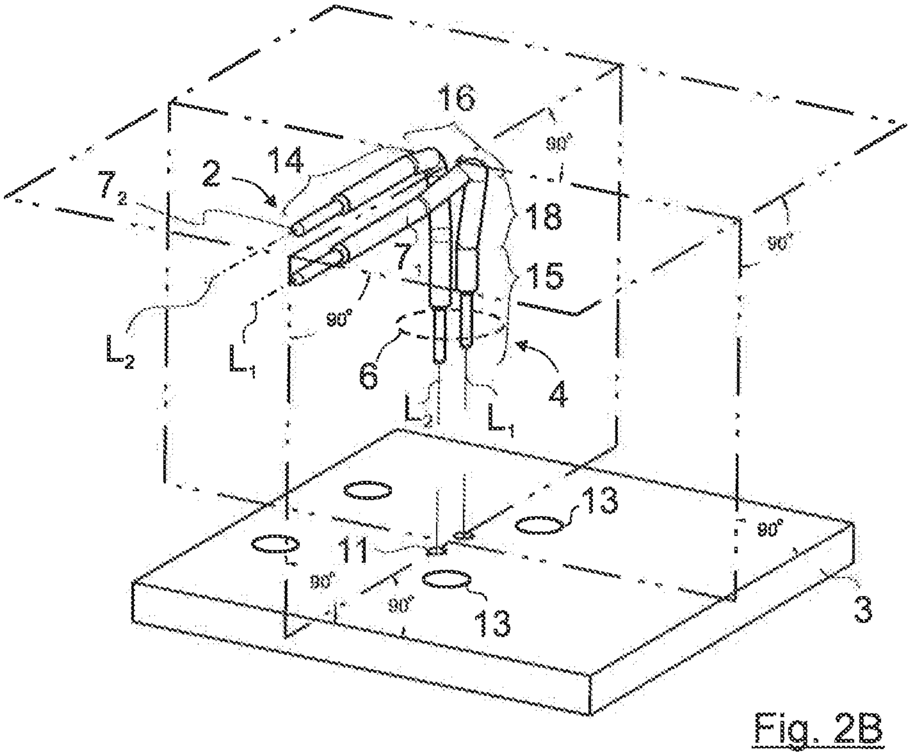
FIG. 2B shows an isometric representation of a second exemplary embodiment of the differential pair of contact elements of the electrical plug-in connector according to the invention.

In all exemplary embodiments of a pair of contact elements 6, and thus in all exemplary embodiments of a differential angled plug-in connector 1, as explained herein by way of example on the basis of the first exemplary embodiment of the pair of contact elements 6 according to FIGS. 2A and 2B, the pair of contact elements 6, composed of a first contact element $7_1$ and a second contact element $7_2$, has a plurality of longitudinal portions, which are connected to each other by particular angular relationships:

As shown in FIG. 2A, the pair of contact elements 6 has, at the first interface 2, a first longitudinal portion 14, in which the first and the second contact element $7_1$ and $7_2$ are each oriented parallel to one another and have a linear characteristic. At the second interface 4, the pair of contact elements 6 has a second longitudinal portion 15, in which the first and the second contact element $7_1$ and $7_2$ are likewise each oriented parallel to one another and likewise have a linear characteristic.

Realized in the pair of contact elements 6, between the first longitudinal portion 14 and the second longitudinal portion 15, there is a third longitudinal portion 16, in which the first and the second contact element $7_1$ and $7_2$ are each bent relative to a first axis of rotation $17_1$ through a first angle of rotation $\phi_1$ and, at the same time, the longitudinal axes $L_1$ and $L_2$ of the first and of the second contact element $7_1$ and $7_2$ are shifted in parallel relative to a second axis of rotation $17_2$ by bending of the first and of the second contact element $7_1$ and $7_2$ through a second angle of rotation $\phi_2$. For the first and of the second contact element $7_1$ and $7_2$, the first axis of rotation $17_1$ is oriented perpendicularly with respect to the longitudinal axis $L_1$ and $L_2$ of the first and of the second contact element $7_1$ and $7_2$, in the first and in the second longitudinal portion 14, 16, respectively. The second axis of rotation $17_2$ extends centrally with respect to the first and of the second contact element $7_1$ and $7_2$, within the entire longitudinal extent of the third longitudinal portion 16.

In addition to the representation in FIG. 2A, the pair of contact elements 6 has a fourth longitudinal portion 18, (FIGS. 7A, 7B), between the second longitudinal portion 15 and the third longitudinal portion 16, in which the longitudinal axes $L_1$ and $L_2$ of the first and of the second contact element $7_1$ and $7_2$ are shifted in parallel relative to a third axis of rotation $17_3$ by bending of the first and of the second contact element $7_1$ and $7_2$ through a third angle of rotation $\phi_3$. The third axis of rotation $17_3$ extends centrally with respect to the first and the second contact element $7_1$ and $7_2$, within the longitudinal extent of the fourth longitudinal portion 18.

Figure 3A:
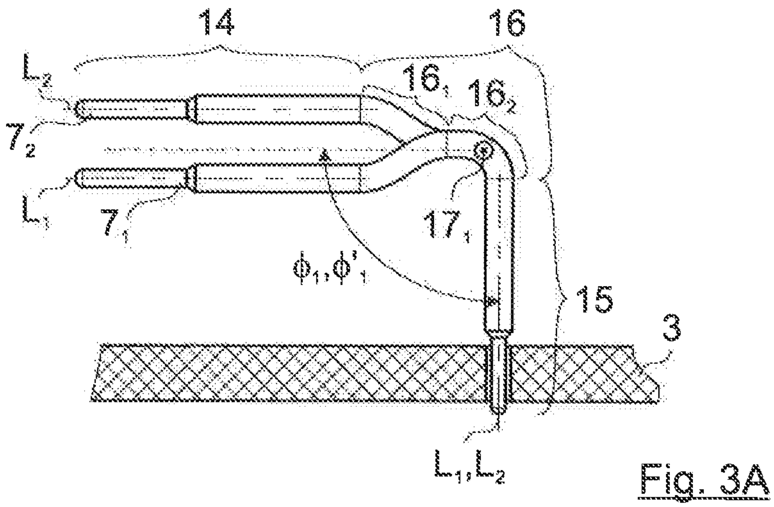
FIG. 3A shows an isometric representation of an exemplary embodiment of the differential pair of contact elements of the electrical plug-in connector according to the invention.
Figure 3B:
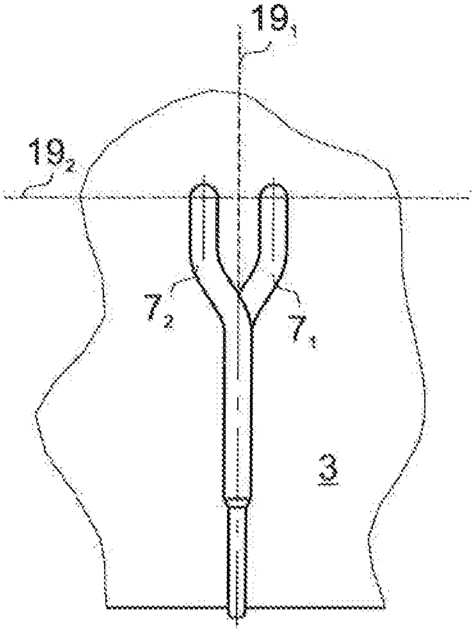
FIG. 3B shows an isomeric representation of an exemplary embodiment of the differential pair of contact elements of the electrical plug-in connector according to the invention.
Figure 3C:
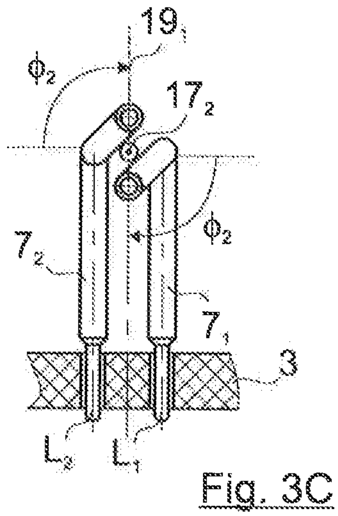
FIG. 3C shows an isometric representation of an exemplary embodiment of the differential pair of contact elements of the electrical plug-in connector according to the invention.

The position of the first axis of rotation $17_1$, the second axis of rotation $17_2$ and the third axis of rotation $17_3$ and the orientation of the first angle of rotation $\phi_1$, the second angle of rotation $\phi_2$ and the third angle of rotation $\phi_3$ in relation to the first and the second contact element $7_1$ and $7_2$ is elucidated yet further by the description of all the exemplary embodiments of the pair of contact elements 6 in FIGS. 3A to 8C, which now follows:

In a first exemplary embodiment of a pair of contact elements 6 according to FIGS. 3A, 3B and 3C, the longitudinal axes $L_1$ and $L_2$ of the first and of the second contact element $7_1$ and $7_2$ are oriented at a first angle $\phi_1$' of 90° with respect to each other between the first and the second longitudinal portions 14 and 15. The first and the second contact elements $7_1$ and $7_2$ are consequently bent relative to a first axis of rotation $17_1$, through a first angle of rotation $\phi_1$' of 90°, between the first and the second longitudinal portion 14 and 15 in a first sub-portion $16_1$ of the third longitudinal portion 16 that adjoins the second longitudinal portion 15.

In the first longitudinal portion 14, as shown in FIGS. 3A, 3B, and 3C, the longitudinal axes $L_1$ and $L_2$ of the first and of the second contact element $7_1$ and $7_2$ span a first plane $19_1$, which is oriented parallel to the longitudinal axes $L_1$ and $L_2$ of the first and of the second contact element $7_1$ and $7_2$ in the second longitudinal portion 15. Thus, the second angle $\phi_2$' between the first plane $19_1$ and the longitudinal axes $L_1$ and $L_2$ of the first and of the second contact element $7_1$ and $7_2$ in the second longitudinal portion 15 is 0°. Consequently, the longitudinal axes $L_1$ and $L_2$ of the first and of the second contact element $7_1$ and $7_2$ are shifted in parallel, between the axial ends of a second sub-portion $16_2$ of the third longitudinal portion 16, which is realized between the first sub-portion $16_1$ of the third longitudinal portion 16 and the first longitudinal portion 14, by means of bending of the first and of the second contact element $7_1$ and $7_2$, relative to a second axis of rotation $17_2$, through a second angle of rotation $\phi_2$ of 90°.

The first and the second contact elements $7_1$ and $7_2$ are bent, relative to the second axis of rotation $17_2$, through the second angle of rotation $\phi_2$ of 90° in such a way that the electrical lengths of the first and of the second contact element $7_1$ and $7_2$ are equal within the second sub-portion $16_2$ of the third longitudinal portion 16. A second plane $19_2$, which is spanned by the longitudinal axes $L_1$ and $L_2$ of the first and of the second contact element $7_1$ and $7_2$ in the second longitudinal portion 15, is thus oriented perpendicularly with respect to the first plane $19_1$, as shown in FIG. 3B.

Figure 4A:
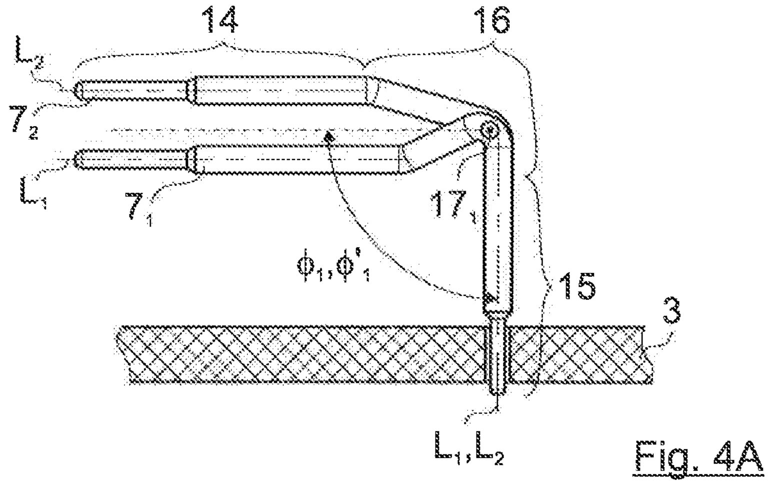
FIG. 4A shows a first side view of a second exemplary embodiment of the differential pair of contact elements of the electrical plug-in connector according to the invention.
Figure 4B:
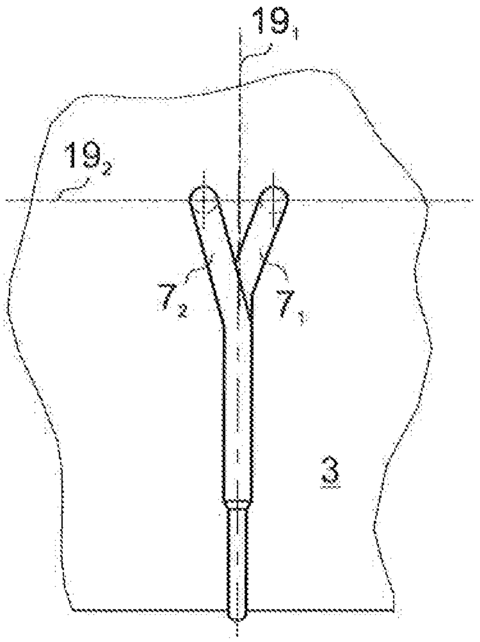
FIG. 4B shows a second side view of a second exemplary embodiment of the differential pair of contact elements of the electrical plug-in connector according to the invention.
Figure 4C:
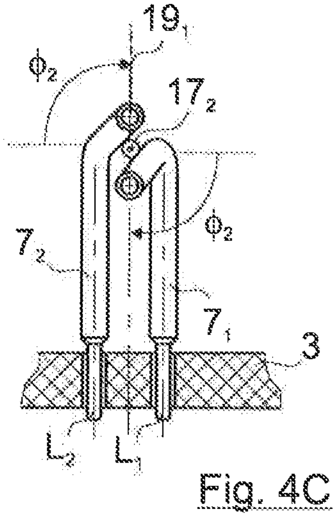
FIG. 4C shows a top view of a second exemplary embodiment of the differential pair of contact elements of the electrical plug-in connector according to the invention.

In a second exemplary embodiment of a pair of contact elements 6 according to FIGS. 4A, 4B and 4C, the bending of the first and of the second contact element $7_1$ and $7_2$, relative to a first axis of rotation $17_1$, through a first angle of rotation $\phi_1$ of 90° and the parallel shifting of the longitudinal axes $L_1$ and $L_2$ of the first and of the second contact element $7_1$ and $7_2$ by bending of the first and of the second contact element $7_1$ and $7_2$, relative to a second axis of rotation $17_2$, through a second angle of rotation $\phi_2$ of 90°, are realized simultaneously between the axial ends of the third longitudinal portion 16. The bending of the first and of the second contact element $7_1$ and $7_2$, relative to the second axis of rotation $17_2$, through the second angle of rotation $\phi_2$ of 90° is likewise effected in such a way that the electrical lengths of the first and of the second contact element $7_1$ and $7_2$ are equal within the third longitudinal portion 16.

Figure 5A:
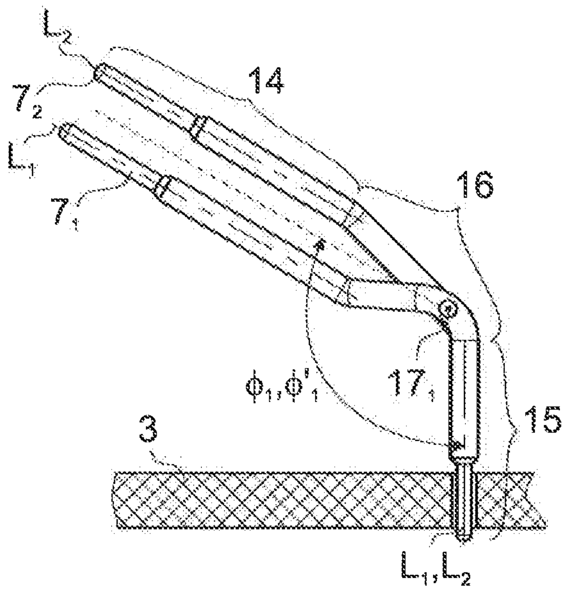
FIG. 5A shows a first side view of a third exemplary embodiment of the differential pair of contact elements of the electrical plug-in connector according to the invention.
Figure 5B:
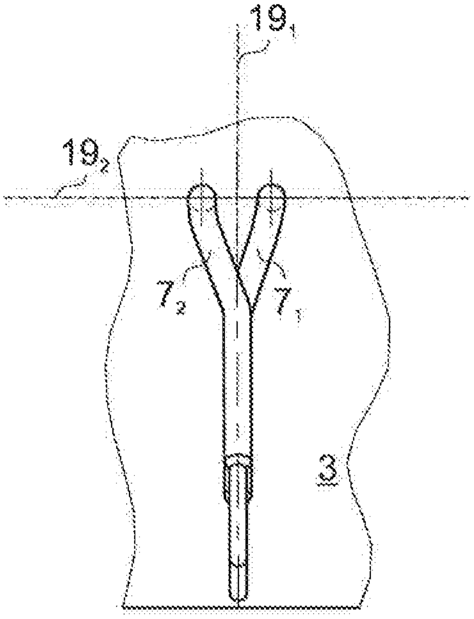
FIG. 5B shows a second side view of a third exemplary embodiment of the differential pair of contact elements of the electrical plug-in connector according to the invention.
Figure 5C:
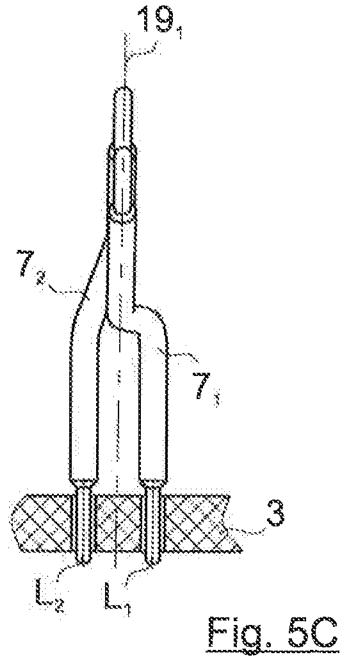
FIG. 5C shows a top view of a third exemplary embodiment of the differential pair of contact elements of the electrical plug-in connector according to the invention.

FIGS. 5A, 5B and 5C show a third exemplary embodiment of a pair of contact elements 6, in which the longitudinal axes $L_1$ and $L_2$ of the first and of the second contact element $7_1$ and $7_2$ are oriented, between the first and the second longitudinal portion 14 and 15, at a first angle $\phi_1$' of 120°, and thus at an angle other than 90° in relation to each other.

Figure 6A:
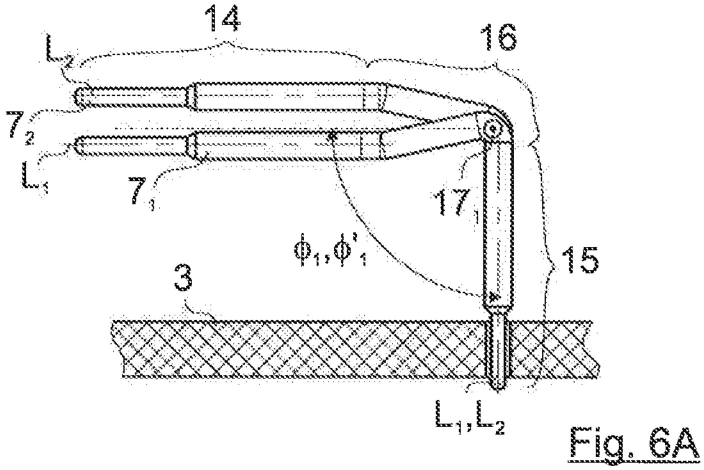
FIG. 6A shows a first side view of a fourth exemplary embodiment of the differential pair of contact elements of the electrical plug-in connector according to the invention.
Figure 6B:
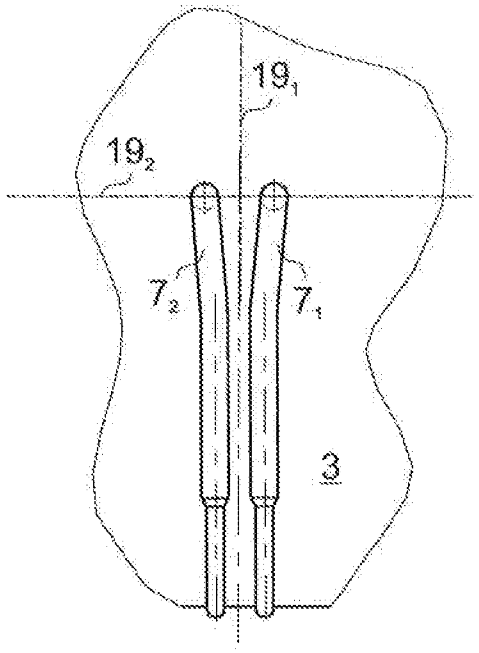
FIG. 6B shows a second side view of a fourth exemplary embodiment of the differential pair of contact elements of the electrical plug-in connector according to the invention.
Figure 6C:
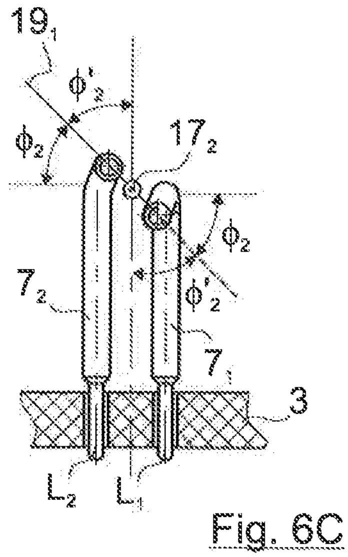
FIG. 6C shows a top view of a fourth exemplary embodiment of the differential pair of contact elements of the electrical plug-in connector according to the invention.

Represented in FIGS. 6A, 6B and 6C is a fourth exemplary embodiment of a pair of contact elements 6, in which the first plane $19_1$ is not oriented parallel to the longitudinal axes $L_1$ and $L_2$ of the first and of the second contact element $7_1$ and $7_2$. The second angle $\phi_2$' between the first plane $19_1$ and the longitudinal axes $L_1$ and $L_2$ of the first and of the second contact element $7_1$ and $7_2$, in the second longitudinal portion 15, is thus other than 0°. The associated second angle of rotation $\phi_2$, through which the first and the second contact element $7_1$ and $7_2$ are respectively bent relative to the second axis of rotation $17_2$ for parallel shifting of the longitudinal axes $L_1$ and $L_2$ of the first and the second contact elements $7_1$ and $7_2$, between the axial ends of the third longitudinal portion 16, is thus also other than 90°.

Figure 7A:
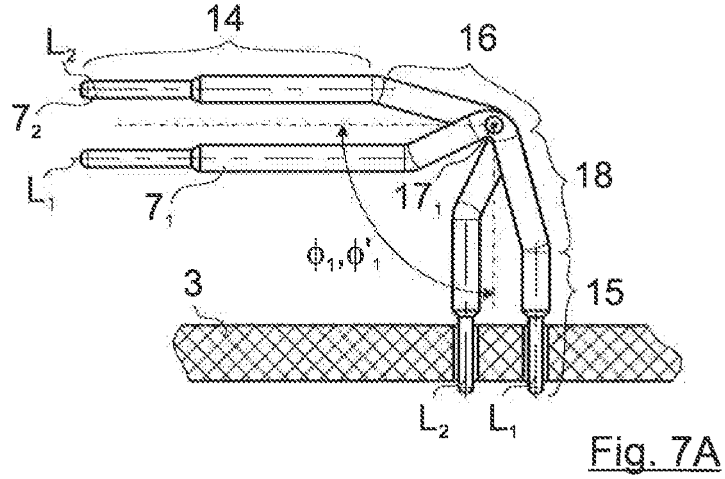
FIG. 7A shows a first side view of a fifth exemplary embodiment of the differential pair of contact elements of the electrical plug-in connector according to the invention.
Figure 7B:
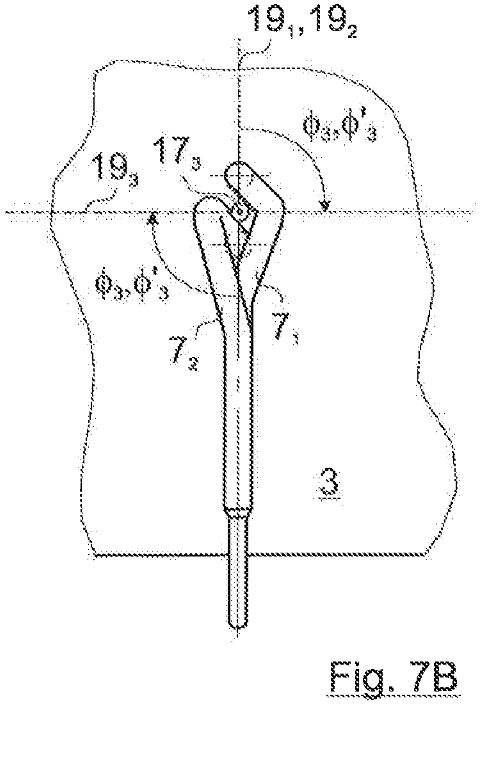
FIG. 7B shows a second side view of a fifth exemplary embodiment of the differential pair of contact elements of the electrical plug-in connector according to the invention.
Figure 7C:
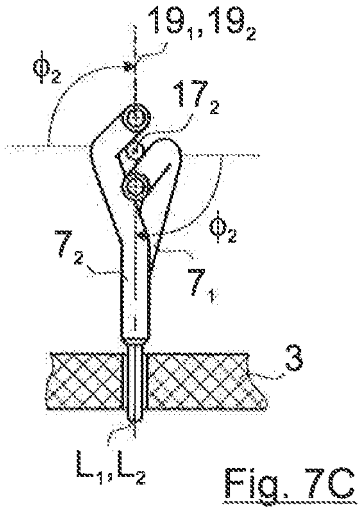
FIG. 7C shows a top view of a fifth exemplary embodiment of the differential pair of contact elements of the electrical plug-in connector according to the invention.

In a fifth exemplary embodiment of a pair of contact elements 6 as shown in FIGS. 7A, 7B and 7C, the first plane $19_1$ lies in the second plane $19_2$. In contrast to the first, second, third and fourth exemplary embodiments of a pair of contact elements 6 in which the longitudinal axes $L_1$ and $L_2$ of the first and of the second contact element $7_1$ and $7_2$, at the second interface 4, are arranged next to each other in the second longitudinal portion 15 and equidistantly from the first interface 2, in the fifth exemplary embodiment the longitudinal axes $L_1$ and $L_2$ of the first contact element $7_1$ and of the second contact element and $7_2$, at the second interface 4, are arranged in succession in the second longitudinal portion 15, and thus at different distances relative to the first interface 2. The second plane $19_2$ is oriented such that it is pivoted by a third angle $\phi_3$ with respect to a third plane $19_3$ that is spanned by the longitudinal axes $L_1$, and $L_2$ of the first and of the second contact element $7_1$ and $7_2$ at an axial end of the third longitudinal portion 15 that faces toward the second interface 4.

In order to shift the longitudinal axes $L_1$ and $L_2$ of the first and of the second contact elements $7_1$ and $7_2$ in parallel from a position in the second plane $19_2$ to a position in the third plane $19_3$, there is a fourth longitudinal portion 18 of the pair of contact elements 6 realized between the second longitudinal portion 15 and the third longitudinal portion 16. Between the axial ends of the fourth longitudinal portion 18, the first and the second contact element $7_1$ and $7_2$ are respectively bent in such a way that, the longitudinal extent of the first and the second contact elements $7_1$ and $7_2$ being the same, the longitudinal axes $L_1$ and $L_2$ of the first and of the second contact element $7_1$ and $7_2$ are shifted in parallel, relative to a third axis of rotation $17_3$, through a third angle of rotation $\phi_3$ of 90°. The third axis of rotation $17_3$ extends centrally with respect to first and of the second contact elements $7_1$ and $7_2$ in the fourth longitudinal portion 18.

Figure 8A:
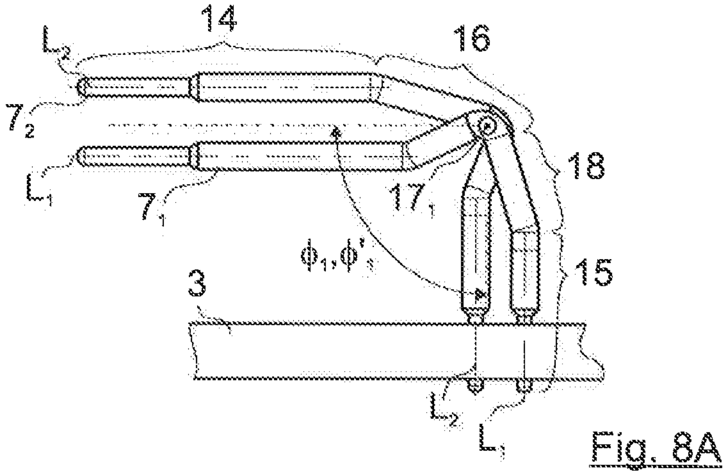
FIG. 8A shows a first side view of a sixth exemplary embodiment of the differential pair of contact elements of the electrical plug-in connector according to the invention.
Figure 8B:
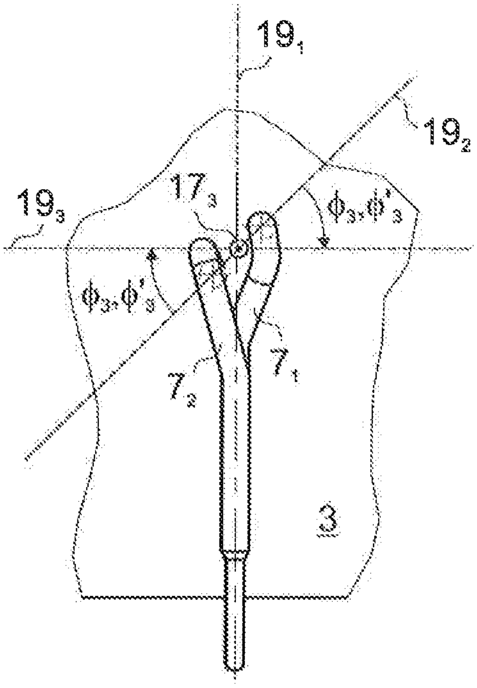
FIG. 8B shows a second side view of a sixth exemplary embodiment of the differential pair of contact elements of the electrical plug-in connector according to the invention.
Figure 8C:
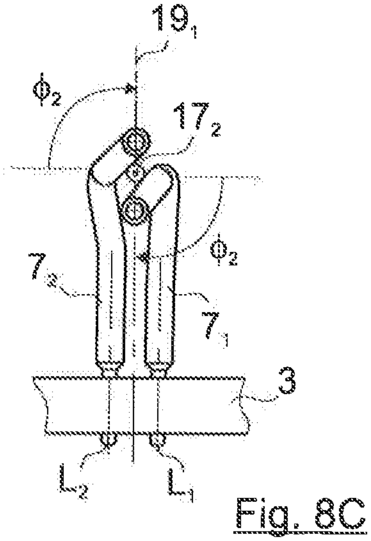
FIG. 8C shows a top view of a sixth exemplary embodiment of the differential pair of contact elements of the electrical plug-in connector according to the invention.

The sixth exemplary embodiment of a pair of contact elements 6 as shown in FIGS. 8A, 8B and 8C shows a rotation of the second plane $19_2$, with respect to the third plane $19_3$, through a third angle of rotation $\phi_3$, which is 45° and thus other than 0°, as in the first to fourth exemplary embodiments, and other than 90°, as in the fifth exemplary embodiment.

In order to shift the longitudinal axes $L_1$ and $L_2$ of the first and of the second contact elements $7_1$ and $7_2$ In parallel from a position in the second plane $19_2$ to a position in the third plane $19_3$, a fourth longitudinal portion 18 of the pair of contact elements 6 is formed between the second longitudinal portion 15 and the third longitudinal portion 16. Between the axial ends of the fourth longitudinal portion 18, the first and the second contact elements $7_1$ and $7_2$ are respectively bent in such a way that, when the longitudinal extent of the first and the second contact elements $7_1$ and $7_2$ is the same, the longitudinal axes $L_1$ and $L_2$ of the first and the second contact elements $7_1$ and $7_2$ are shifted in parallel relative to a third axis of rotation $17_3$ by a third angle of rotation $\phi_3$ equal to 90°. The third axis of rotation $17_3$ extends centrally with respect to the first and of the second contact elements $7_1$ and $7_2$ in the fourth longitudinal portion 18.

The sixth exemplary embodiment of a pair of contact elements 6 according to FIGS. 8A, 8B and 8C shows a rotation of the second plane $19_2$ with respect to the third plane $19_3$ by a third angle of rotation $\phi_3$, which is 45° and thus different from 0° as in the first to fourth exemplary embodiments and different from 90° as in the fifth exemplary embodiment.

Finally, FIGS. 9A, 9B and 9C show a differential electrical plug-in connection 20 comprising a differential electrical plug-in connector 1 according to the invention and an associated differential electrical mating plug-in connector 5. The differential mating plug-in connector 5 may be embodied as a straight differential mating plug-in connector or, as represented in FIGS. 9A, 9B and 9C, an angled differential mating plug-in connector 5.

The angled differential mating plug-in connector 5 includes a pair of mating contact elements 21 comprising a first mating contact element $22_1$ and a second mating contact element $22_2$ which, when the differential plug-in connection 20 is plug-connected, electrically and mechanically contact the first contact element $7_1$ and the second contact element $7_2$, respectively, of the angled differential plug-in connector 1. The first mating contact element $22_1$ and the second mating contact element $22_2$ are spaced apart in an electrically insulated manner from the outer conductor mating contact element 24 of the differential mating plug-in connector 5 by an insulator element 23. The two mating contact elements $22_1$ and $22_2$ are each bent, in a third longitudinal portion 25 of the pair of mating-contact elements 21, relative to a fourth axis of rotation $17_4$, through a fourth angle of rotation $\phi_4$, preferably of 90°, and are of equal electrical length. The first mating contact element $22_1$ and the second mating contact element $22_2$ are each realized linearly in the first longitudinal portion 26 of the pair of mating-contact elements 21 at the connector interface, and in the second longitudinal portion 27 of the pair of mating-contact elements 21 at the cable interface, and are each of the same electrical length.

This results in a differential electrical plug-in connection 5 that has an equal electrical length in all longitudinal portions of the contact elements $7_1$ and $7_2$ and of the mating contact elements $22_1$ and $22_2$, respectively, and thus advantageously does not create a phase offset (skewing) in the differential signal.

Although the present invention has been described in full above with reference to preferred exemplary embodiments, it is not limited thereto, but can be modified in a variety of ways.

Operation

Having described the structure of our Plug Connector Assembly and Battery Assembly, its operation is briefly described.

A principal object of the present invention an electrical plug-in connector (1) for transmitting a differential signal between a first interface (2) and a second interface (4), comprising: a pair of contact elements (6), the pair of contact elements (6) having a first contact element ($7_1$) and a second contact element ($7_2$); and wherein each of the first contact element ($7_1$) and the second contact element ($7_2$) have a first longitudinal portion (14) and a second longitudinal portion (15) and a third longitudinal portion (16) that is between the first longitudinal portion (14) and the second longitudinal portion (15); a longitudinal axis defined by each of the first contact element ($7_1$) and of the second contact element ($7_2$) in the first longitudinal portion (14) of the first contact element ($7_1$) and of the second contact element ($7_2$) at the first interface (2) is oriented at a first angle ($\phi_1$') with respect to the longitudinal axis of the first contact element ($7_1$) and of the second contact element ($7_2$) in the second longitudinal portion (15) of the first contact element ($7_1$) and of the second contact element ($7_2$) at the second interface (4); and wherein a first plane ($19_1$) spanned by the longitudinal axis of the first contact element ($7_1$) and of the second contact element ($7_2$) in the first longitudinal portion (14) is oriented at a second angle ($\phi_2$') with respect to the longitudinal axes of the first contact element ($7_1$) and of the second contact element ($7_2$) in the second longitudinal portion (15); and wherein the third longitudinal portion (16), the first contact element ($7_1$) and the second contact element ($7_2$) are each bent, relative to a first axis of rotation ($17_1$) that is oriented orthogonally with respect to the longitudinal axis of the first contact element ($7_1$) and of the second contact element ($7_2$), respectively, in the first longitudinal portion (14) and in the second longitudinal portion (15), respectively, through a first angle of rotation $\phi_1$ corresponding to a first angle $\phi_1$'; and wherein in the third longitudinal portion (16) the first contact element ($7_1$) and the contact element ($7_2$) are each additionally bent in such a way that the longitudinal axes of the first contact element ($7_1$) and of the second contact element ($7_2$) are shifted in parallel, through a second angle of rotation $\phi_2$, relative to a second axis of rotation ($17_2$) that extends centrally between the first contact element ($7_1$) and the second contact element ($7_2$) in the third longitudinal portion (16); and the second angle of rotation $\phi_2$ results from subtraction of a second angle $\phi_2$' from an angle of 90°.

A further object of the present invention an electrical plug-in connector (1) wherein, in the third longitudinal portion (16), a longitudinal extent of the first contact element ($7_1$) and the second contact element ($7_2$) being equal, the longitudinal axes of the first contact element ($7_1$) and the second contact element ($7_2$) are shifted in parallel, relative to the second axis of rotation ($17_2$), through the second angle of rotation $\phi_2$.

A further object of the present invention an electrical plug-in connector (1) wherein, in the third longitudinal portion (16), the first contact element ($7_1$) and the second contact element ($7_2$) are each bent, relative to the first axis of rotation ($17_1$), through the first angle of rotation $\phi_1$ with an equal radius of bend.

A further object of the present invention an electrical plug-in connector (1) wherein, in the third longitudinal portion (16), the first contact element ($7_1$) and the second contact element ($7_2$) are each bent, relative to the second axis of rotation ($17_2$), through the second angle of rotation $\phi_2$ in such a way that the longitudinal axes of the first contact element ($7_1$) and the second contact element ($7_2$) are each shifted by a same amount in parallel in a first radial direction, with respect to the second axis of rotation ($17_2$), and are each shifted by a same amount in parallel in a second radial direction, with respect to the second axis of rotation ($17_2$), that is oriented orthogonally with respect to the first radial direction.

A further object of the present invention an electrical plug-in connector (1) wherein the first contact element ($7_1$) and the second contact element ($7_2$) are each bent through the first angle of rotation $\phi_1$ in first sub-portion ($16_1$) of the third longitudinal portion (16) that adjoins the second longitudinal portion (15), and are each bent through the second angle of rotation $\phi_2$ in a second sub-portion ($16_2$) of the third longitudinal portion (16) that is between the first longitudinal portion (12) and the first sub-portion ($16_1$) of the third longitudinal portion (16).

A further object of the present invention an electrical plug-in connector (1) wherein the first angle of rotation $\phi_1$ lies in an angular range of between 45° and 135°.

A further object of the present invention an electrical plug-in connector (1) wherein the second angle of rotation $\phi_2$ is greater than 0° or less thin 0°.

A further object of the present invention an electrical plug-in connector (1) wherein in the third longitudinal portion (16), the first contact element ($7_1$) and the second contact element ($7_2$) are each of the same extent in a direction of the longitudinal axes of the first contact element ($7_1$) and the second contact element ($7_2$) in the first longitudinal portion (14).

A further object of the present invention an electrical plug-in connector (1) and further comprising: a fourth longitudinal portion (18) of the first contact element ($7_1$) and the second contact element ($7_2$) is realized between the third longitudinal portion (16) and the second longitudinal portion (15); and wherein in the fourth longitudinal portion (18) the first contact element ($7_1$) and the second contact element ($7_2$) are each bent in such a way that, with an equal longitudinal extent of the first contact element ($7_1$) and of the second contact element ($7_2$), the longitudinal axes of the first contact element ($7_1$) and of the second contact element ($7_2$) are shifted in parallel, through a third angle of rotation $\phi_3$, relative to a third axis of rotation ($17_3$) that extends centrally between the first contact element ($7_1$) and the second contact element ($7_2$) in the fourth longitudinal portion (18).

A further object of the present invention an electrical plug-in connector (1) wherein the third angle of rotation $\phi_3$ corresponds to a third angle $\phi$3' between a second plane ($19_2$), which is spanned by the longitudinal axes of the first contact element ($7_1$) and of the second contact element ($7_2$) in the second longitudinal portion (4); and wherein a third plane ($19_3$) which is spanned by the longitudinal axes of the first contact element ($7_1$) and of the second contact element ($7_2$) at an axial end of the third longitudinal portion (16) that faces toward the second interface (4).

A further object of the present invention an electrical plug-in connector (1) wherein the third angle of rotation $\phi$3 is greater than 0°, or less than 0°.

A further object of the present invention an electrical plug-in connector (1) wherein the first interface (2) is configured to contact a mating plug-in connector, and the second interface (4) is configured to contact a printed circuit board.

A further object of the present invention an electrical plug-in connector (1) wherein, in the first longitudinal portion (14), and in the second longitudinal portion (15) and in the third longitudinal portion (16), a distance between the first contact element ($7_1$) and the second contact element ($7_2$) is the same in each case and/or a diameter of the first contact element ($7_1$) and of the second contact element ($7_2$) is the same in each case.

A further object of the present invention an electrical plug-in connection (21) comprising: an electrical mating plug-in connector (5); and an electrical plug-in connector (1) for electrical connection to the electrical mating plug-in connector (5), and for transmitting a differential signal between a first interface (2) and a second interface (4), the electrical plug-in connector (1) having a pair of contact elements (6), the pair of contact elements (6) having a first contact element ($7_1$) and a second contact element ($7_2$), and wherein each of the first contact element ($7_1$) and the second contact element ($7_2$) have a first longitudinal portion (14) and a second longitudinal portion (15) and a third longitudinal portion (16) that is between the first longitudinal portion (14) and the second longitudinal portion (15), a longitudinal axis defined by each of the first contact element ($7_1$) and of the second contact element ($7_2$) in the first longitudinal portion (14) of the first contact element ($7_1$) and of the second contact element ($7_2$) at the first interface (2) is oriented at a first angle ($\phi_1$') with respect to the longitudinal axis of the first contact element ($7_1$) and of the second contact element ($7_2$) in the second longitudinal portion (15) of the first contact element ($7_1$) and of the second contact element ($7_2$) at the second interface (4), and wherein a first plane ($19_1$) spanned by the longitudinal axis of the first contact element ($7_1$) and of the second contact element ($7_2$) in the first longitudinal portion (14) is oriented at a second angle ($\phi_2$') with respect to the longitudinal axes of the first contact element ($7_1$) and of the second contact element ($7_2$) in the second longitudinal portion (15), and wherein the third elongational portion (16), the first contact element ($7_1$) and the second contact element ($7_2$) are each bent, relative to a first axis of rotation ($17_1$) that is oriented orthogonally with respect to the longitudinal axis of the first contact element ($7_1$) and of the second contact element ($7_2$), respectively, in the first longitudinal portion (14) and in the second longitudinal portion (15), respectively, through a first angle of rotation $\phi_1$ corresponding to a first angle $\phi_1$', and wherein in the third longitudinal portion (16) the first contact element ($7_1$) and the second contact element ($7_2$) are each additionally bent in such a way that the longitudinal axes of the first contact element ($7_1$) and of the second contact element ($7_2$) are shifted in parallel, through a second angle of rotation $\phi_2$, relative to a second axis of rotation ($17_2$) that extends centrally between the first contact element ($7_1$) and the second contact element ($7_2$) in the third longitudinal portion (16), and the second angle of rotation $\phi_2$ results from subtraction of a second angle $\phi_2$' from an angle of 90°.

A further object of the present invention an electrical plug-in connection (21) wherein the mating plug-in connector (5) has a pair of mating contact elements (21), and the pair of mating contact elements (21) have a first mating contact element ($\mathbf{22_1}$) and a second mating contact element ($\mathbf{22_2}$), and the first and the second mating contact elements ($\mathbf{22_1}$, $\mathbf{22_2}$) each have a same electric length and each is bent through a fourth angle of rotation $\phi_4$, preferably each of 90°, with an equal radius of curvature.

A further object of the present invention an electrical plug-in connector (1) wherein the first angle of rotation $\phi_1$ is 90°.

A still further object of the present invention an electrical plug-in connector (1) wherein the second angle of rotation $\phi_2$ is ±90°.

An even still further object of the present invention a plug-in connector (1) wherein the third angle of rotation $\phi$3 is ±90°.

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. An electrical plug-in connector (1) for transmitting a differential signal between a first interface (2) and a second interface (4), comprising:

a pair of contact elements (6), the pair of contact elements (6) having a first contact element ($7_1$) and a second contact element ($7_2$); and wherein each of the first contact element ($7_1$) and the second contact element ($7_2$) have a first longitudinal portion (14) and a second longitudinal portion (15) and a third longitudinal portion (16) that is between the first longitudinal portion (14) and the second longitudinal portion (15):

a longitudinal axis defined by each of the first contact element ($7_1$) of the first and of the second contact element ($7_2$) in the first longitudinal portion (14) of the first contact element ($7_1$) and of the second contact element ($7_2$) at the first interface (2) is oriented at a first angle ($\phi_1$') with respect to the longitudinal axis of the first contact element ($7_1$) and of the second contact element ($7_2$) in the second longitudinal portion (15) of the first contact element ($7_1$) and of the second contact element ($7_2$) at the second interface (4); and wherein a first plane ($19_1$) spanned by the longitudinal axis of the first contact element ($7_1$) and of the second contact element ($7_2$) in the first longitudinal portion (14) is oriented at a second angle ($\phi_2$') with respect to the longitudinal axes of the first contact element ($7_1$) and of the second contact element ($7_2$) in the second longitudinal portion (15); and wherein the third longitudinal portion (16), the first contact element ($7_1$) and the second contact element ($7_2$) are each bent, relative to a first axis of rotation ($17_1$) that is oriented orthogonally with respect to the longitudinal axis of the first contact element ($7_1$) and of the second contact element ($7_2$) respectively, in the first longitudinal portion (14) and in the second longitudinal portion (15), respectively, through a first angle of rotation $\phi_1$ corresponding to a first angle $\phi_1$'; and wherein in the third longitudinal portion (16) the first contact element ($7_1$) and the second contact element ($7_2$) are each additionally bent in such a way that the longitudinal axes of the first contact element ($7_1$) and of the second contact element ($7_2$) are shifted in parallel, through a second angle of rotation $\phi_2$, relative to a second axis of rotation ($17_2$) that extends centrally between the first contact element ($7_1$) and the second contact element ($7_2$) in the third longitudinal portion (16); and the second angle of rotation $\phi_2$ results from subtraction of a second angle $\phi_2$' from an angle of 90°.

2. The electrical plug-in connector (1) as claimed in claim 1 and wherein in the third longitudinal portion (16), a longitudinal extent of the first contact element ($7_1$) and the second contact element ($7_2$) being equal, the longitudinal axes of the first contact element ($7_1$) and the second contact element ($7_2$) are shifted in parallel, relative to the second axis of rotation ($17_2$), through the second angle of rotation $\phi_2$.

3. The electrical plug-in connector (1) as claimed in claim 1 and wherein, in the third longitudinal portion (16), the first contact element ($7_1$) and the second contact element ($7_2$) are each bent, relative to the first axis of rotation ($17_1$), through the first angle of rotation $\phi_1$ with an equal radius of bend.

4. The electrical plug-in connector (1) as claimed in claim 1 and wherein, in the third longitudinal portion (16), the first contact element ($7_1$) and the second contact element ($7_2$) are each bent, relative to the second axis of rotation ($17_2$), through the second angle of rotation $\phi_2$ in such a way that the longitudinal axes of the first contact element ($7_1$) and the second contact element ($7_2$) are each shifted by a same amount in parallel in a first radial direction, with respect to the second axis of rotation ($17_2$), and are each shifted by a same amount in parallel in a second radial direction, with respect to the second axis of rotation ($17_2$), that is oriented orthogonally with respect to the first radial direction.

5. The electrical plug-in connector (1) as claimed in claim 1 and wherein the first contact element ($7_1$) and the second contact element ($7_2$) are each bent through the first angle of rotation $\phi_1$ in a first sub-portion ($16_1$) of the third longitudinal portion (16) that adjoins the second longitudinal portion (15), and are each bent through the second angle of rotation $\phi_2$ in a second sub-portion ($16_2$) of the third longitudinal portion (16) that is between the first longitudinal portion (12) and the first sub-portion ($16_1$) of the third longitudinal portion (16).

6. The electrical plug-in connector (1) as claimed in claim 1 and wherein the first angle of rotation $\phi_1$ lies in an angular range of between 45° and 135°.

7. The electrical plug-in connector (1) as claimed in claim 1 and wherein the second angle of rotation $\phi_2$ is greater than 0° or less than 0°.

8. The electrical plug-in connector (1) as claimed in claim 1 and wherein, in the third longitudinal portion (16), the first contact element ($7_1$) and the second contact element ($7_2$) are each of the same extent in a direction of the longitudinal axes of the first contact element ($7_1$) and the second contact element ($7_2$) in the first longitudinal portion (14).

9. The electrical plug-in connector (1) as claimed in claim 1 and further comprising:

- a fourth longitudinal portion (18) of the first contact element ($7_1$) and the second contact element ($7_2$) is realized between the third longitudinal portion (16) and the second longitudinal portion (15); and wherein
- in the fourth longitudinal portion (18) the first contact element ($7_1$) and the second contact element ($7_2$) are each bent in such a way that, with an equal longitudinal extent of the first contact element ($7_1$) and of the second contact element ($7_2$), the longitudinal axes of the first contact element ($7_1$) and of the second contact element ($7_2$) are shifted in parallel, through a third angle of rotation $\phi_3$, relative to a third axis of rotation ($17_3$) that extends centrally between the first contact element ($7_1$) and the second contact element ($7_2$) in the fourth longitudinal portion (18).

10. An electrical plug-in connector (1) as claimed in claim 9 and wherein the third angle of rotation $\phi_3$ corresponds to a third angle $\phi$3' between a second plane ($19_2$), which is spanned by the longitudinal axes of the first contact element ($7_1$) and of the second contact element ($7_2$) in the second longitudinal portion (4); and wherein

- a third plane ($19_3$), which is spanned by the longitudinal axes of the first contact element ($7_1$) and of the second contact element ($7_2$) at an axial end of the third longitudinal portion (16) that faces toward the second interface (4).

11. The electrical plug-in connector (1) as claimed in claim 10 and wherein the third angle of rotation $\phi$3 is greater than 0°, or less than 0°.

12. The electrical plug-in connector (1) as claimed in claim 1 and wherein the first interface (2) is configured to contact a mating plug-in connector, and the second interface (4) is configured to contact a printed circuit board.

13. The electrical plug-in connector (1) as claimed in claim 1 and wherein, in the first longitudinal portion (14), and in the second longitudinal portion (15) and in the third longitudinal portion (16), a distance between the first contact element ($7_1$) and the second contact element ($7_2$) is the same in each case and/or a diameter of the first contact element ($7_1$) and of the second contact element ($7_2$).

14. An electrical plug-in connection (21) comprising:

an electrical mating plug-in connector (5); and an electrical plug-in connector (1) for electrical connection to the electrical mating plug-in connector (5), and for transmitting a differential signal between a first interface (2) and a second Interface (4), the electrical plug-in connector (1) having

- a pair of contact elements (6), the pair of contact elements (6) having a first contact element ($7_1$) and a second contact element ($7_2$), and wherein
- each of the first contact element ($7_1$) and the second contact element ($7_2$) have a first longitudinal portion (14) and a second longitudinal portion (15) and a third longitudinal portion (16) that is between the first longitudinal portion (14) and the second longitudinal portion (15),
- a longitudinal axis defined by each of the first contact element ($7_1$) and of the second contact element ($7_2$) In the first longitudinal portion (14) of the first contact element ($7_1$) and of the second contact element ($7_2$) at the first interface (2) is oriented at a first angle ($\phi_1$') with respect to the longitudinal axis of the first contact element ($7_1$) and of the second contact element ($7_2$) in the second longitudinal portion (15) of the first contact element ($7_1$) and of the second contact element ($7_2$) at the second interface (4), and wherein
- a first plane ($19_1$) spanned by the longitudinal axis of the first contact element ($7_1$) and of the second contact element ($7_2$) in the first longitudinal portion (14) is oriented at a second angle ($\phi_2$') with respect to the longitudinal axes of the first contact element ($7_1$) and of the second contact element ($7_2$) in the second longitudinal portion (15), and wherein
- the third longitudinal portion (16), the first contact element ($7_1$) and the second contact element ($7_2$) are each bent, relative to a first axis of rotation ($17_1$) that is oriented orthogonally with respect to the longitudinal axis of the first contact element ($7_1$) and of the second contact element ($7_2$), respectively, in the first longitudinal portion (14) and in the second longitudinal portion (15), respectively, through a first angle of rotation $\phi_1$ corresponding to a first angle $\phi_1$', and wherein
- in the third longitudinal portion (16) the first contact element ($7_1$) and the second contact element ($7_2$) are each additionally bent in such a way that the longitudinal axes of the first contact element ($7_1$) and of the second contact element ($7_2$) are shifted in parallel, through a second angle of rotation $\phi_2$, relative to a second axis of rotation ($17_2$) that extends centrally between the first contact element ($7_1$) and the second contact element ($7_2$) in the third longitudinal portion (16), and
- the second angle of rotation $\phi_2$ results from subtraction of a second angle $\phi_2$' from an angle of 90°.

15. The electrical plug-in connection (21) claimed in claim 14 and wherein the mating plug-in connector (5) has a pair of mating contact elements (21), and the pair of mating contact elements (21) have a first mating contact element ($22_1$) and a second mating contact element ($22_2$), and the first and the second mating contact elements ($22_1$, $22_2$) each have a same electrical length and each is bent through a fourth angle of rotation $\phi_4$, preferably each of 90°, with an equal radius of curvature.

16. The electrical plug-in connector (1) as claimed in claim 1 and wherein the first angle of rotation $\phi_1$ is 90°.

17. The electrical plug-in connector (1) as claimed in claim 1 and wherein the second angle of rotation $\phi_2$ is ±90°.

18. The electrical plug-in connector (1) as claimed in claim 10 and wherein the third angle of rotation $\phi3$ is ±90°.

* * * * *